United States Patent
Gou et al.

(10) Patent No.: US 12,063,667 B2
(45) Date of Patent: Aug. 13, 2024

(54) METHOD AND APPARATUS FOR TRANSMISSION PROCESSING, AND COMPUTER-READABLE STORAGE MEDIUM

(71) Applicant: ZTE CORPORATION, Guangdong (CN)

(72) Inventors: Wei Gou, Guangdong (CN); Peng Hao, Guangdong (CN); Ting Fu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 404 days.

(21) Appl. No.: 17/439,008

(22) PCT Filed: Mar. 19, 2020

(86) PCT No.: PCT/CN2020/080087
§ 371 (c)(1),
(2) Date: Sep. 14, 2021

(87) PCT Pub. No.: WO2020/187279
PCT Pub. Date: Sep. 24, 2020

(65) Prior Publication Data
US 2022/0150882 A1    May 12, 2022

(30) Foreign Application Priority Data

Mar. 19, 2019  (CN) .......................... 201910211542.6

(51) Int. Cl.
*H04W 72/51*   (2023.01)
*H04W 72/0446*   (2023.01)
(Continued)

(52) U.S. Cl.
CPC ....... *H04W 72/51* (2023.01); *H04W 72/0446* (2013.01); *H04W 72/23* (2023.01); *H04W 72/56* (2023.01)

(58) Field of Classification Search
CPC . H04W 72/51; H04W 72/0446; H04W 72/23; H04W 72/56; H04W 72/569; H04W 72/12; H04W 72/1263
See application file for complete search history.

(56) References Cited

U.S. PATENT DOCUMENTS

| 2018/0279229 A1 | 9/2018 | Dinan et al. |
| 2019/0059093 A1 | 2/2019 | Cheng et al. |
| 2022/0150882 A1* | 5/2022 | Gou .................. H04W 72/23 |

FOREIGN PATENT DOCUMENTS

| CN | 10852167 A | 9/2018 |
| CN | 108632977 A | 10/2018 |

(Continued)

OTHER PUBLICATIONS

European Search Report dated Nov. 7, 2022, for Application No. EP20772740.5 (13 pages).
(Continued)

*Primary Examiner* — Jianye Wu
(74) *Attorney, Agent, or Firm* — KDW Firm PLLC

(57) ABSTRACT

Provided are a method and apparatus for transmission processing and a computer-readable storage medium. The method includes determining for at least two transmissions that the starting position of a first transmission is earlier than a point G; and transmitting the first transmission from the starting position of the first transmission to the point G, or transmitting the first transmission from the starting position of the first transmission to the ending position of the first transmission. The point G is a time point of first preset time before the starting position of a second transmission.

18 Claims, 6 Drawing Sheets

(51) Int. Cl.
*H04W 72/23* (2023.01)
*H04W 72/56* (2023.01)

(56) References Cited

FOREIGN PATENT DOCUMENTS

CN 110536463 A 12/2019
WO 2018129325 A1 7/2018

OTHER PUBLICATIONS

Vivo, "Enhancement for Scheduling/HARQ/CSI processing timeline", 3GPP TSG RAN WG1 #96, R1-1901695, Athens, Greece, Feb. 25-Mar. 1, 2019.
Oppo, "UCI enhancements for URLLC" 3GPP TSG RAN WG1 #96, R1-1902417, Athens, Greece, Feb. 25-Mar. 1, 2019.
Qualcomm Incorporated, "Summary for Potential Enhancements to Scheduling/HARQ/CSI Processing Time", 3GPP TSG-RAN WG1 Meeting #96, R1-1903804, Athens, Greece, Feb. 25-Mar. 1, 2019.
InterDigital (rapporteur), "Summary of [104#38][NR/IIOT] Intra UE prioritization UL Data Data (Interdigital)", 3GPP TSG-RAN WG2 Meeting #105, R2-1901458, Athens, Greece, Feb. 25-Mar. 1, 2019.
ZTE. "UL Control Enhancements for NR URLLC" 3GPP TSG RAN WG1 Meeting #98bis R1-1910101, Oct. 8, 2019, text, p. 6, section 3.
ZTE. "UL Control Enhancements for NR URLLC" 3GPP TSG RAN WG1 Meeting #99 R1-1911964, Nov. 9, 2019, text, p. 5, section 3.
Vivo. "DL Intra UE Tx Prioritization for URLLC" 3GPP TSG RAN WG1 Meeting #96 R1-1901699, Feb. 16, 2019, text, p. 2, sections 2.2.-2.3.
International Search Report for the International Patent Application No. PCT/CN2020/080087, mailed Jun. 23, 2020, 2 pages.

* cited by examiner

METHOD AND APPARATUS FOR TRANSMISSION PROCESSING, AND COMPUTER-READABLE STORAGE MEDIUM

CROSS-REFERENCE TO RELATED APPLICATIONS

This is a National Stage Application, filed under 35 U.S.C. 371, of International Patent Application No. PCT/CN2020/080087, filed on Mar. 19, 2020, which claims priority to Chinese Patent Application No. 201910211542.6 filed with the China National Intellectual Property Administration (CNIPA) on Mar. 19, 2019, the disclosures of which are incorporated herein by reference in their entireties.

TECHNICAL FIELD

The present application relates to the technical field of wireless communication networks, for example, a method and apparatus for transmission processing and a computer-readable storage medium.

BACKGROUND

In the process of a service interaction between a user equipment (UE) and a base station, the different requirements of various services may require multiple services to be transmitted simultaneously, resulting in a time-domain overlap in the service interaction.

SUMMARY

The present application provides a method and apparatus for transmission processing and a computer-readable storage medium so as to provide a service transmission rule. Accordingly, in the case where the preparation processes or transmission processes of at least two transmissions overlap each other, the transmission with a higher priority is guaranteed to be performed normally and the transmission with a lower priority is optimized.

The present application provides a method for transmission processing. The method includes the steps below.

It is determined for at least two transmissions that the starting position of a first transmission is earlier than a point G.

The first transmission is transmitted from the starting position of the first transmission to the point G. Alternatively, the first transmission is transmitted from the starting position of the first transmission to the ending position of the first transmission.

The point G is a time point of first preset time before the starting position of a second transmission.

The present application further provides a method for transmission processing. The method includes the steps below.

It is determined for at least two transmissions that the starting position of a first transmission is earlier than a point G.

It is determined that the first transmission is transmitted from the starting position of the first transmission to the point G or from the starting position of the first transmission to the ending position of the first transmission.

The point G is a time point of first preset time before the starting position of a second transmission.

The present application provides an apparatus for transmission processing. The apparatus includes a time-domain determination module and a transmission module.

The time-domain determination module is configured to determine for at least two transmissions that the starting position of a first transmission is earlier than a point G.

The transmission module is configured to transmit the first transmission from the starting position of the first transmission to the point G or transmit the first transmission from the starting position of the first transmission to the ending position of the first transmission.

The point G is a time point of first preset time before the starting position of a second transmission.

The present application further provides an apparatus for transmission processing. The apparatus includes a time-domain determination module and a transmission module and a data determination module.

The time-domain determination module is configured to determine for at least two transmissions that the starting position of a first transmission is earlier than a point G.

The data determination module is configured to determine that the first transmission is transmitted from the starting position of the first transmission to the point G or from the starting position of the first transmission to the ending position of the first transmission.

The point G is a time point of first preset time before the starting position of a second transmission.

The present application provides a computer-readable storage medium. The storage medium stores a computer program which, when executed by a processor, causes the processor to perform the method of any embodiment of the present application.

More description of the preceding embodiments and other aspects of the present application and the implementations thereof is provided in the BRIEF DESCRIPTION OF DRAWINGS, DETAILED DESCRIPTION, and claims.

DETAILED DESCRIPTION

Embodiments of the present application are described hereinafter in detail in conjunction with the drawings.

With the development of wireless communication technology, ultra-reliable and low-latency communications (URLLC) transmission comes into being. Compared with the enhanced mobile broadband (eMBB) transmission, the URLLC transmission requires higher reliability and timeliness. For example, the URLLC transmission has very strict requirements on latency, with the transmission required to be completed within a certain time. However, the eMBB transmission does not have such strict requirements on latency and may be completed using multiple retransmissions.

In some scenarios, a UE may support both the eMBB transmission and the URLLC transmission. Since the eMBB transmission and the URLLC transmission have different requirements, the eMBB transmission may overlap the URLLC transmission in the time domain.

Exemplarily, when the eMBB of the UE needs to be scheduled, a base station sends the grant information (that is, the downlink control information (DCI)) of the eMBB transmission to the UE to schedule the eMBB transmission (For example, when a downlink transmission service is scheduled, a physical downlink shared channel (PDSCH) is used for transmission; when an uplink transmission service is scheduled, a physical uplink shared channel (PUSCH) is used for transmission). After the grant information of the eMBB transmission is sent, in case of a burst URLLC transmission requirement, the base station sends the grant information of the URLLC transmission to the UE to schedule the URLLC transmission. Due to the latency requirement of the URLLC transmission, the URLLC transmission may overlap the previously scheduled EMBB transmission in the time domain. However, the URLLC transmission cannot be delayed but be scheduled immediately. Accordingly, a conflict between the two transmissions occurs. To reduce the transmission loss, the transmissions need to be processed.

The present application provides a method and apparatus for transmission processing and a computer-readable storage medium so as to provide a service transmission rule. Accordingly, in the case where the preparation processes or transmission processes of at least two transmissions overlap each other, the transmission with a higher priority is guaranteed to be performed normally and the transmission with a lower priority is optimized.

In this embodiment, as described in the preceding example, the mode in which the base station sends the grant information may be referred to as a dynamic grant. The method for transmission processing provided in embodiments of the present application applies not only to a transmission with a dynamic grant but also to a semi-persistent scheduling transmission (also referred to as a transmission with a configured grant). This is not limited in embodiments of the present application.

Figure 1:
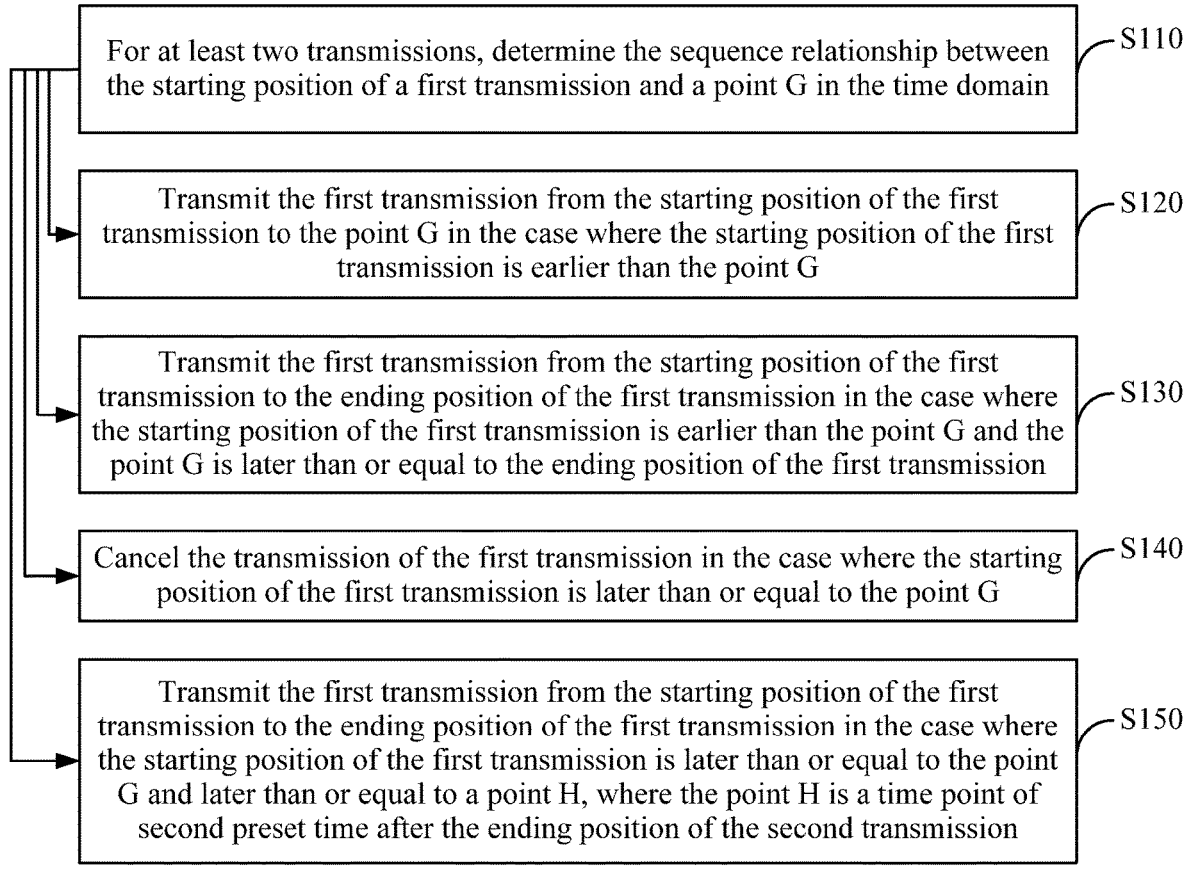
FIG. 1 is a flowchart of a method for transmission processing according to an embodiment.

FIG. 1 is a flowchart of a method for transmission processing according to an embodiment. As shown in FIG. 1, the method provided in this embodiment applies to a sending end. The method includes the steps below.

In S110, for at least two transmissions, the sequence relationship between the starting position of a first transmission and a point G is determined in the time domain.

Embodiments of the present application are described using an example in which any two transmissions among the at least two transmissions are a first transmission and a second transmission, with the priority of the first transmission lower than the priority of the second transmission. When the number of transmissions is greater than or equal to three, for these transmissions, any two transmissions may be selected according to the mode of permutation and combination and processed according to the preceding rules until all the transmissions are traversed.

The first transmission may be an uplink transmission or a downlink transmission. The second transmission may be an uplink transmission or a downlink transmission. In one embodiment, when the first transmission is an uplink transmission, the sending end of the first transmission may be a UE and the receiving end of the first transmission may be a base station. When the first transmission is a downlink transmission, the sending end of the first transmission may be a base station and the receiving end of the first transmission may be UE. Similarly, when the second transmission is an uplink transmission, the sending end of the second transmission may be a UE and the receiving end of the second transmission may be a base station. When the second transmission is a downlink transmission, the sending end of the second transmission may be a base station and the receiving end of the second transmission may be UE.

The first transmission and the second transmission are in the same carrier or different carriers.

The grant mode of the first transmission may be a dynamic grant or a configured grant. The grant mode of the second transmission may be a dynamic grant or a configured grant. In one embodiment, in the case where the first transmission and the second transmission are each provided with a dynamic grant, the dynamic grant of the first transmission is prior to the dynamic grant of the second transmission. In the case where the first transmission and the second transmission are each provided with a configured grant, the determined transmission time of the first transmission is earlier than the determined transmission time of the second transmission.

The preparation process or transmission process of the first transmission overlaps the preparation process or transmission process of the second transmission in the time domain. In this embodiment, the first transmission overlaps the second transmission in the time domain, which indicates a collision between the first transmission and the second transmission. That is, the transmission process of the second transmission may affect the transmission process of the first transmission. For example, in the case of uplink transmissions, a UE starts to prepare the content of the first transmission after receiving the dynamic grant of the first transmission. It is assumed that at least the second preset time is required for the preparation. Then it is determined that the second transmission needs to be sent. The priority of the second transmission is higher than the priority of the first transmission. The UE also prepares the content of the second transmission. In general, the UE with a relatively low capability may prepare the content of only one transmission at a time. Accordingly, the UE stops preparing the content of the first transmission or discards the content of the first transmission that has been prepared and not transmitted. The content preparation here may be regarded as a preparation in the mode of symbol-by-symbol pipelining. That is, a symbol is sent after being prepared. Meanwhile, the next symbol is prepared.

Additionally, the first transmission may be data or control information. The second transmission may be data or control information.

When the first transmission overlaps the second transmission in the time domain, the sending end firstly may determine the sequence relationship between the starting position of the first transmission and the point G in the time domain. The point G is a time point of first preset time before the starting position of the second transmission.

In S120, the first transmission is transmitted from the starting position of the first transmission to the point G in the case where the starting position of the first transmission is earlier than the point G.

Figure 2A:
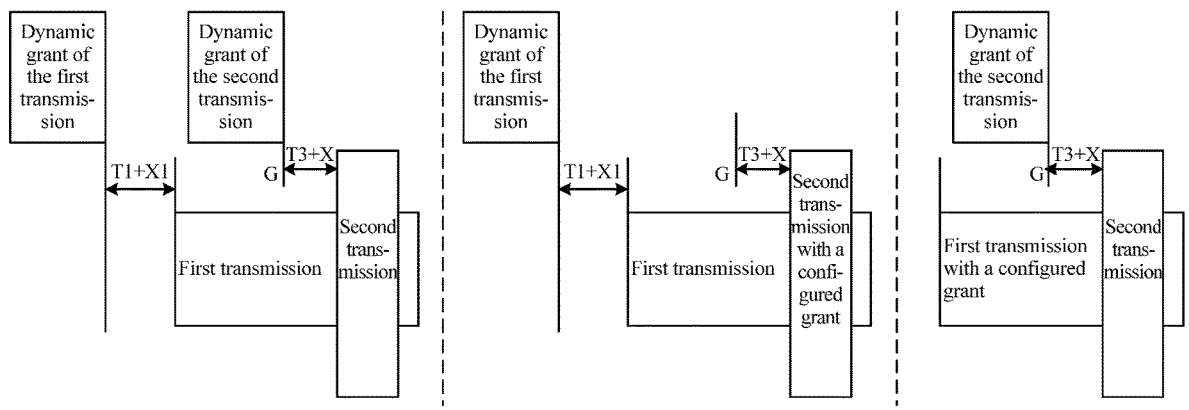
FIG. 2(a) is a diagram illustrating a relationship between a first transmission and a second transmission in the time domain according to an embodiment.
Figure 2B:
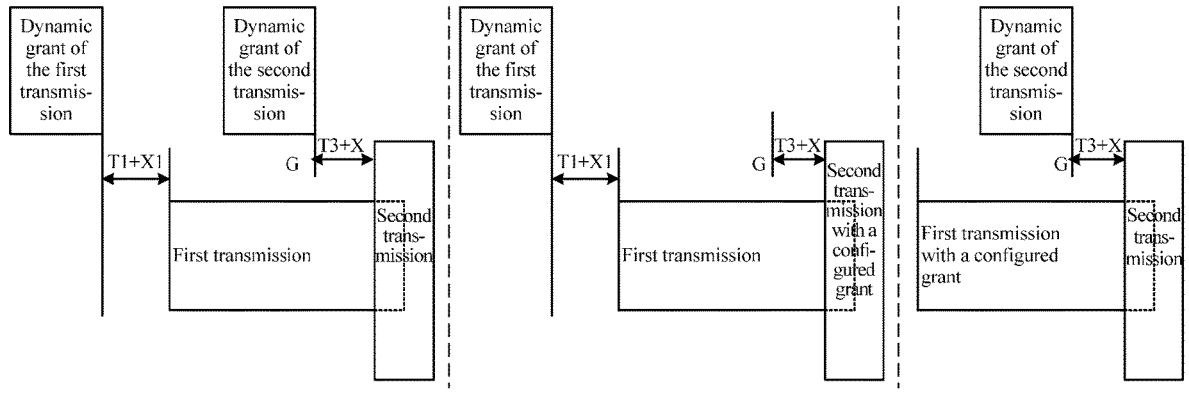
FIG. 2(b) is a diagram illustrating another relationship between the first transmission and the second transmission in the time domain according to an embodiment.
Figure 2C:
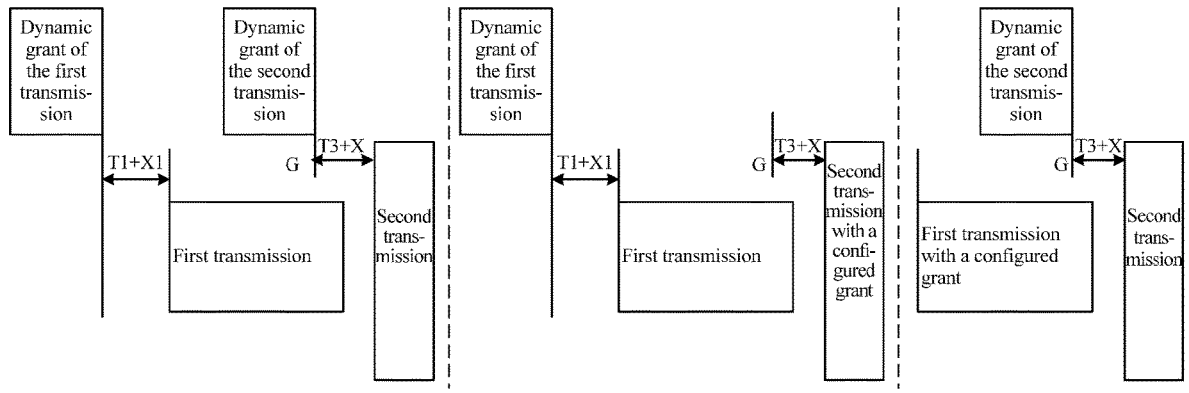
FIG. 2(c) is a diagram illustrating another relationship between the first transmission and the second transmission in the time domain according to an embodiment.

FIG. 2(a) is a diagram illustrating a relationship between a first transmission and a second transmission in the time domain according to an embodiment. FIG. 2(b) is a diagram illustrating a relationship between the first transmission and the second transmission in the time domain according to an embodiment. FIG. 2(c) is a diagram illustrating a relationship between the first transmission and the second transmission in the time domain according to an embodiment. As shown in FIGS. 2(a), 2(b), and 2(c), the starting point of the first transmission is earlier than the point G in each of FIGS. 2(a), 2(b), and 2(c). Corresponding to the three scenarios of FIGS. 2(a), 2(b), and 2(c), the sending end transmits the first transmission from the starting position of the first transmission to the point G and transmits the second transmission from the starting position of the second transmission to the ending position of the second transmission. In this case, it can ensure that the second transmission with a higher priority can be transmitted normally. Meanwhile, part of the first transmission is transmitted. Accordingly, the object of optimizing the transmission with a lower priority and reducing the transmission loss is obtained.

In S130, the first transmission is transmitted from the starting position of the first transmission to the ending position of the first transmission in the case where the starting position of the first transmission is earlier than the point G and where the point G is later than or equal to the ending position of the first transmission.

Figure 3:
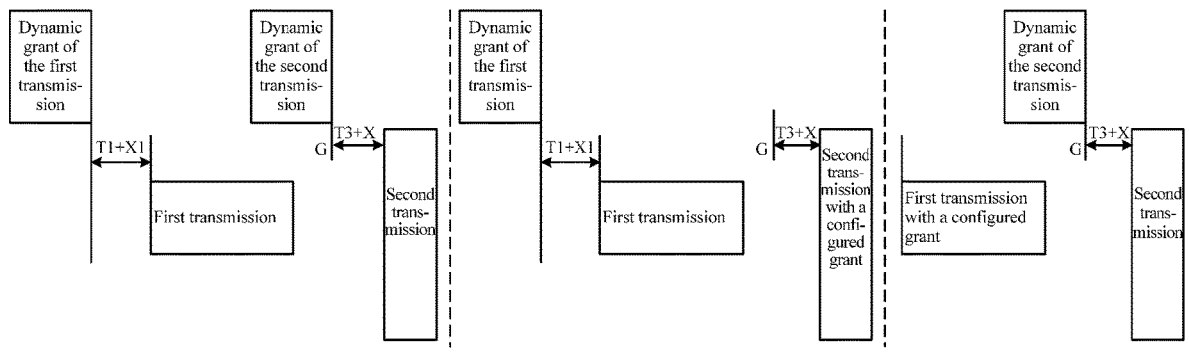
FIG. 3 is a diagram illustrating another relationship between the first transmission and the second transmission in the time domain according to an embodiment.

FIG. 3 is a diagram illustrating another relationship between the first transmission and the second transmission in the time domain according to an embodiment. As shown in FIG. 3, the starting position of the first transmission is earlier than the point G in FIG. 3. Different from FIGS. 2(a), 2(b), and 2(c), the point G is later than or equal to the ending position of the first transmission in FIG. 3. In this scenario, the sending end may transmit the first transmission from the starting position of the first transmission to the ending position of the first transmission and transmit the second transmission from the starting position of the second transmission to the ending position of the second transmission. In this case, it can not only ensure that the second transmission with a higher priority can be transmitted normally but also enable that the first transmission with a lower priority is transmitted normally.

In S140, the transmission of the first transmission is canceled in the case where the starting position of the first transmission is later than or equal to the point G.

Figure 4:
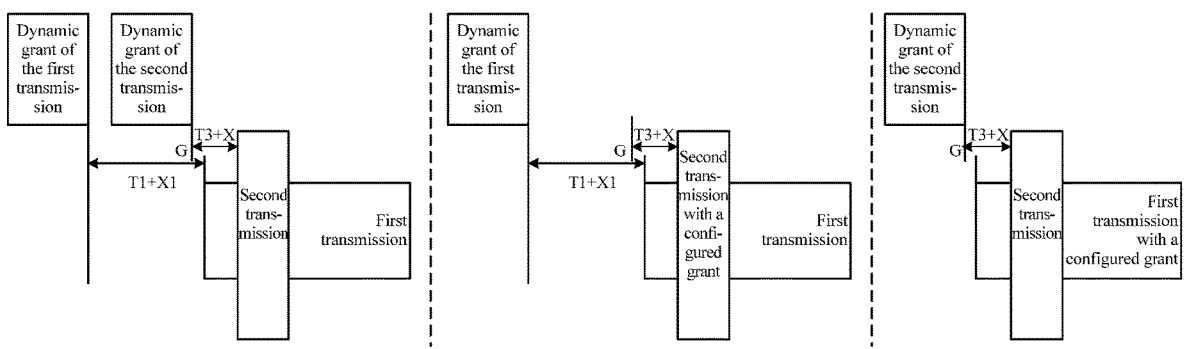
FIG. 4 is a diagram illustrating another relationship between the first transmission and the second transmission in the time domain according to an embodiment.

FIG. 4 is a diagram illustrating another relationship between the first transmission and the second transmission in the time domain according to an embodiment. As shown in FIG. 4, the starting position of the first transmission is later than or equal to the point G in FIG. 4. In this scenario, to guarantee a normal transmission of the second transmission with a higher priority, the sending end cancels the transmission of the first transmission and transmits the second transmission from the starting position of the second transmission to the ending position of the second transmission.

In S150, the first transmission is transmitted from the starting position of the first transmission to the ending position of the first transmission in the case where the starting position of the first transmission is later than or equal to the point G and later than or equal to a point H. The point H is a time point of second preset time after the ending position of the second transmission.

Figure 5:
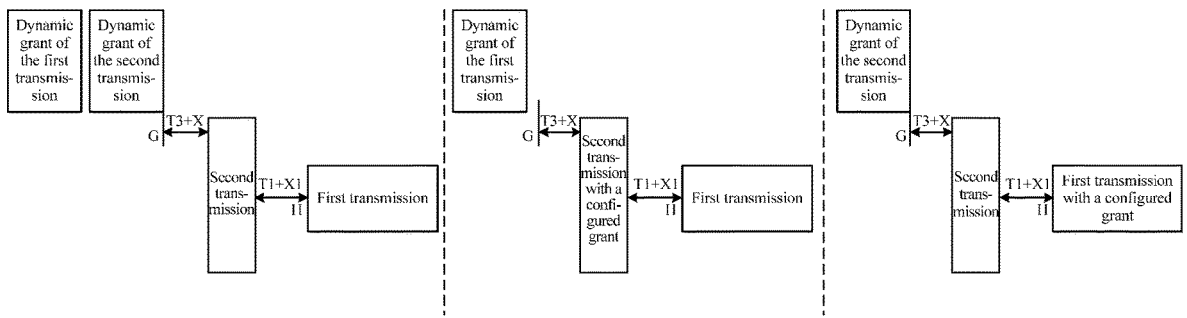
FIG. 5 is a diagram illustrating another relationship between the first transmission and the second transmission in the time domain according to an embodiment.

FIG. 5 is a diagram illustrating another relationship between the first transmission and the second transmission in the time domain according to an embodiment. As shown in FIG. 5, the starting position of the first transmission is later than or equal to the point G. Different from FIG. 4, the starting position of the first transmission is further later than or equal to the point H. In this scenario, the sending end may transmit the second transmission from the starting position of the sending transmission to the ending position of the second transmission and then transmit the first transmission from the starting position of the first transmission to the ending position of the first transmission. In this case, it can not only ensure that the second transmission with a higher priority can be transmitted normally but also enable that the first transmission with a lower priority is transmitted normally.

In this embodiment, the preceding steps S120 to S150 are parallel steps. Additionally, the point G in embodiments of the present application may correspond to the ending position of the dynamic grant of the second transmission or may be later than the ending position of the dynamic grant of the second transmission.

In one embodiment, the first preset time is T3, T3+X, or T3+X+D; and the second preset time is T1 or T1+X1.

In one embodiment, in the case where the first transmission and the second transmission are each an uplink transmission, T1 and T3 denote the time N2 for processing the data of the first transmission and the time N2 for processing the data of the second transmission respectively (both the value of T1 and the value of T3 may be N2), or T1 and T3 denote second processing time $T_{proc,2}$; and D denotes the time D2 for canceling the processed first transmission or the processed second transmission. In the case where the first transmission and the second transmission are each a downlink transmission, T1 and T3 denote the time N1 for processing the data of the first transmission and the time N1 for processing the data of the second transmission respectively, or T1 and T3 denote first processing time $T_{proc,1}$ and D denotes the time D1 for canceling the processed first transmission or the processed second transmission. X1 and X denote the adjustment amount of T1 and the adjustment amount of T3 respectively.

In one embodiment, the value of D1 is 0; the value of D2 is 0; the value of X1 is 0; and the value of X is 0.

In one embodiment, the first preset time further includes that the time point corresponding to the first preset time is postponed by Q symbols in the time domain or is advanced by M symbols in the time domain.

In one embodiment, the value of Q is determined according to the time for processing a physical downlink control channel (PDCCH) and/or the time for processing a physical downlink shared channel (PDSCH), and the value of M is determined according to the number of symbols occupied by a dynamic grant. Alternatively, the value of Q is an agreed value or 0, and the value of M is an agreed value or 0.

Figure 6:
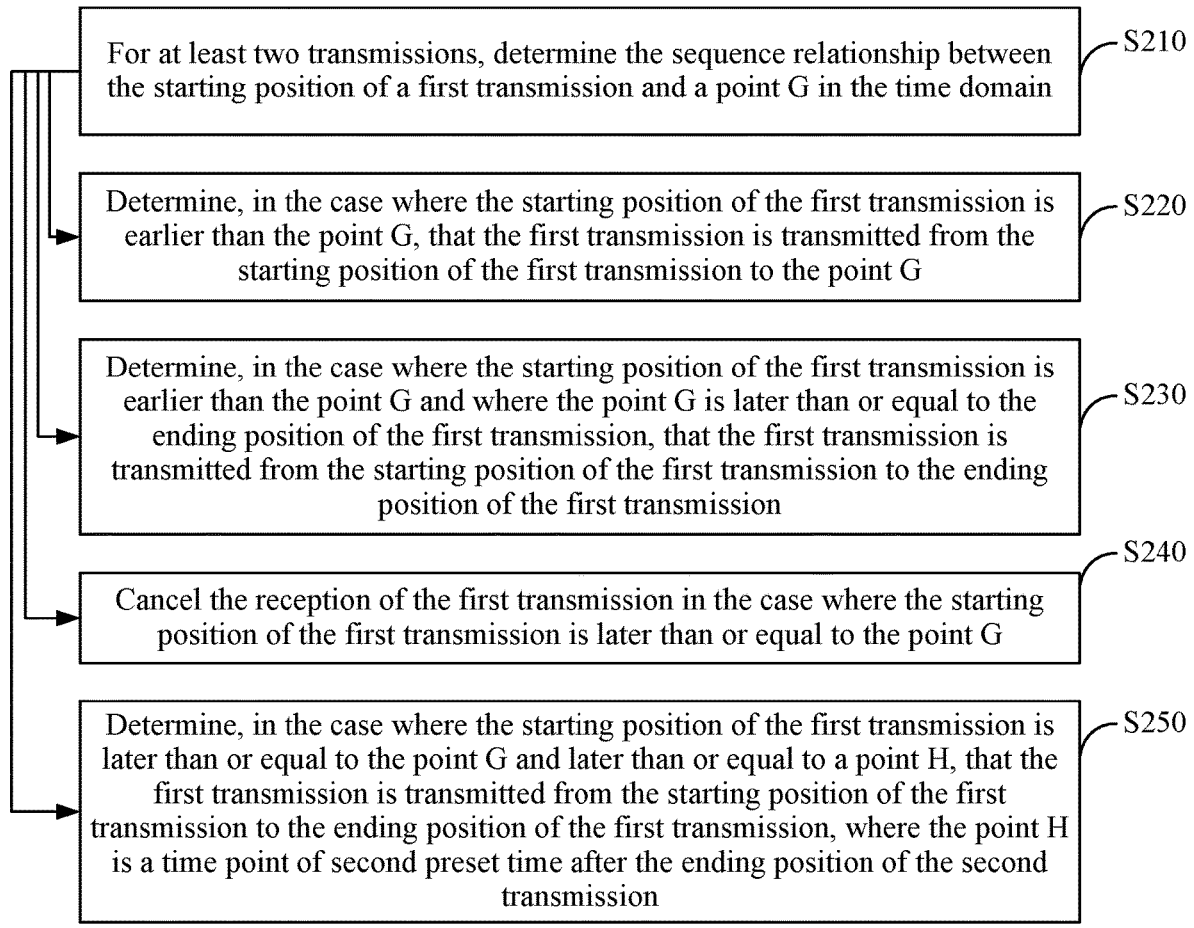
FIG. 6 is a flowchart of another method for transmission processing according to an embodiment.

FIG. 6 is a flowchart of another method for transmission processing according to an embodiment. As shown in FIG. 6, the method provided in this embodiment applies to a receiving end. The method includes the steps below.

In S210, for at least two transmissions, the sequence relationship between the starting position of a first transmission and a point G is determined in the time domain.

Embodiments of the present application are described using an example in which any two transmissions among the at least two transmissions are a first transmission and a second transmission, with the priority of the first transmission lower than the priority of the second transmission.

The first transmission may be an uplink transmission or a downlink transmission. The second transmission may be an uplink transmission or a downlink transmission.

The first transmission and the second transmission are in the same carrier or different carriers.

The grant mode of the first transmission may be a dynamic grant or a configured grant. The grant mode of the second transmission may be a dynamic grant or a configured grant. In one embodiment, in the case where the first transmission and the second transmission are each provided with a dynamic grant, the dynamic grant of the first transmission is prior to the dynamic grant of the second transmission. In the case where the first transmission and the second transmission are each provided with a configured grant, the determined transmission time of the first transmission (that is, the arrival time of the data of the first transmission) is earlier than the determined transmission time of the second transmission (that is, the arrival time of the data of the second transmission).

The first transmission overlaps the second transmission in the time domain.

When the first transmission overlaps the second transmission in the time domain, the receiving end may determine the sequence relationship between the starting position of the first transmission and the point G in the time domain. In this embodiment, the point G is a time point of first preset time before the starting position of the second transmission.

In S220, it is determined, in the case where the starting position of the first transmission is earlier than the point G, that the first transmission is transmitted from the starting position of the first transmission to the point G.

As shown in FIGS. 2(*a*), 2(*b*), and 2(*c*), the starting point of the first transmission is earlier than the point G in each of FIGS. 2(*a*), 2(*b*), and 2(*c*). Corresponding to the three scenarios of FIGS. 2(*a*), 2(*b*), and 2(*c*), the receiving end determines that the first transmission is transmitted from the starting position of the first transmission to the point G and that the second transmission is transmitted from the starting position of the second transmission to the ending position of the second transmission. In this case, it can ensure that the second transmission with a higher priority can be transmitted normally. Meanwhile, part of the first transmission is transmitted.

Accordingly, the object of optimizing the transmission with a lower priority and reducing the transmission loss is obtained.

In S230, it is determined, in the case where the starting position of the first transmission is earlier than the point G and where the point G is later than or equal to the ending position of the first transmission, that the first transmission is transmitted from the starting position of the first transmission to the ending position of the first transmission.

Referring to FIG. 3, as shown in FIG. 3, the starting position of the first transmission is earlier than the point G in FIG. 3. Different from FIGS. 2(*a*), 2(*b*), and 2(*c*), the point G is later than or equal to the ending position of the first transmission in FIG. 3. In this scenario, the receiving end may determine that the first transmission is transmitted from the starting position of the first transmission to the ending position of the first transmission and determine that the second transmission is transmitted from the starting position of the second transmission to the ending position of the second transmission. In this case, it can not only ensure that the second transmission with a higher priority can be transmitted normally but also enable that the first transmission with a lower priority is transmitted normally.

In S240, the reception of the first transmission is canceled in the case where the starting position of the first transmission is later than or equal to the point G.

Referring to FIG. 4, as shown in FIG. 4, the starting position of the first transmission is later than or equal to the point G in FIG. 4. In this scenario, to guarantee a normal transmission of the second transmission with a higher priority, the receiving end cancels the reception of the first transmission and determines that the second transmission is transmitted from the starting position of the second transmission to the ending position of the second transmission.

In S250, it is determined, in the case where the starting position of the first transmission is later than or equal to the point G and later than or equal to a point H, that the first transmission is transmitted from the starting position of the first transmission to the ending position of the first transmission. The point H is a time point of second preset time after the ending position of the second transmission.

Referring to FIG. 5, as shown in FIG. 5, the starting position of the first transmission is later than or equal to the point G. Different from FIG. 4, the starting position of the first transmission is further later than or equal to the point H. In this scenario, the receiving end may determine that the second transmission is transmitted from the starting position of the sending transmission to the ending position of the second transmission and determine that the first transmission is transmitted from the starting position of the first transmission to the ending position of the first transmission. In this case, it can not only ensure that the second transmission with a higher priority can be transmitted normally but also enable that the first transmission with a lower priority is transmitted normally.

In this embodiment, the preceding steps S220 to S250 are parallel steps.

In one embodiment, the first preset time is T3, T3+X, or T3+X+D; and the second preset time is T1 or T1+X1.

In one embodiment, in the case where the first transmission and the second transmission are each an uplink transmission, T1 and T3 denote the time N2 for processing the data of the first transmission and the time N2 for processing the data of the second transmission respectively (both the value of T1 and the value of T3 may be N2), or T1 and T3 denote second processing time $T_{proc,2}$; and D denotes the time D2 for canceling the processed first transmission or the processed second transmission. In the case where the first transmission and the second transmission are each a downlink transmission, T1 and T3 denote the time N1 for processing the data of the first transmission and the time N1 for processing the data of the second transmission respectively, or T1 and T3 denote first processing time $T_{proc,1}$; and D denotes the time D1 for canceling the processed first transmission or the processed second transmission. X1 and X denote the adjustment amount of T1 and the adjustment amount of T3 respectively.

In one embodiment, the value of D1 is 0; the value of D2 is 0; the value of X1 is 0; and the value of X is 0.

In one embodiment, the first preset time further includes that the time point corresponding to the first preset time is postponed by Q symbols in the time domain or is advanced by M symbols in the time domain.

In one embodiment, the value of Q is determined according to the time for processing a physical downlink control channel (PDCCH) and/or the time for processing a physical downlink shared channel (PDSCH), and the value of M is determined according to the number of symbols occupied by a dynamic grant. Alternatively, the value of Q is an agreed value or 0, and the value of M is an agreed value or 0.

A method for transmission processing provided in the present application may further include the steps below.

In S310, for at least two transmissions, the sequence relationship between the starting position of a first transmission and a point G is determined in the time domain.

In S320, the first transmission is transmitted from the starting position of the first transmission at least to the point G in the case where the starting position of the first transmission is earlier than the point G.

In this embodiment, the step in which the first transmission is transmitted from the starting position of the first transmission at least to the point G may refer to that the first transmission is transmitted from the starting position of the first transmission to the point G or that the first transmission is transmitted from the starting position of the first transmission to any position after the point G. This is not limited in embodiments of the present application.

In S330, the first transmission is transmitted from the starting position of the first transmission to the ending position of the first transmission in the case where the starting position of the first transmission is earlier than the point G and where the point G is later than or equal to the ending position of the first transmission.

In S340, the transmission of the first transmission is canceled in the case where the starting position of the first transmission is later than or equal to the point G.

In S350, the first transmission is transmitted from the starting position of the first transmission to the ending position of the first transmission in the case where the starting position of the first transmission is later than or equal to the point G and later than or equal to a point H. The point H is a time point of second preset time after the ending position of the second transmission.

Steps S310 to S350 apply to a sending end. In this embodiment, the detailed description of steps S310 to S350 may refer to the preceding steps S110 to S150 and is not repeated here for simplicity.

A method for transmission processing provided in the present application may further include the steps below.

In S410, for at least two transmissions, the sequence relationship between the starting position of a first transmission and a point G is determined in the time domain.

In S420, it is determined, in the case where the starting position of the first transmission is earlier than the point G, that the first transmission is transmitted from the starting position of the first transmission at least to the point G.

In this embodiment, the determination that the first transmission is transmitted from the starting position of the first transmission at least to the point G may refer to the determination that the first transmission is transmitted from the starting position of the first transmission to the point G or refer to the determination that the first transmission is transmitted from the starting position of the first transmission to any position after the point G. This is not limited in embodiments of the present application.

In S430, it is determined, in the case where the starting position of the first transmission is earlier than the point G and where the point G is later than or equal to the ending position of the first transmission, that the first transmission is transmitted from the starting position of the first transmission to the ending position of the first transmission.

In S440, the reception of the first transmission is canceled in the case where the starting position of the first transmission is later than or equal to the point G.

In S450, it is determined, in the case where the starting position of the first transmission is later than or equal to the point G and later than or equal to a point H, that the first transmission is transmitted from the starting position of the first transmission to the ending position of the first transmission. The point H is a time point of second preset time after the ending position of the second transmission.

Steps S410 to S450 apply to a receiving end. In this embodiment, the detailed description of steps S410 to S450 may refer to the preceding steps S210 to S250 and is not repeated here for simplicity.

In one embodiment, the priority of the second transmission is higher than the priority of the first transmission. The second transmission is always transmitted based on a dynamic grant or a configured grant. The first transmission and the second transmission may be not provided with a dynamic grant. That is, the first transmission and the second transmission are each provided with a configured grant in this case. When the first transmission and the second transmission are each provided with a dynamic grant, the dynamic grant of the first transmission is transmitted prior to the dynamic grant of the second transmission. When at least one of the first transmission or the second transmission is provided with a configured grant, the arrival time point (the determined transmission time point) of the first transmission is earlier than the arrival time point of the second transmission. For a transmission provided with a configured grant, the starting position of the transmission or the ending position of the transmission is determined according to the configured grant. The first transmission and the second transmission may be each an uplink transmission or each a downlink transmission. Alternatively, one of the first transmission and the second transmission may be an uplink transmission, and the other of the first transmission and the second transmission may be a downlink transmission. The first transmission and the second transmission may be in two carriers respectively or may be in the same carrier.

When a plurality of transmissions exist in the same UE, the transmission position of a transmission with a lower priority is determined first (either provided with a dynamic grant or through a configured grant; for a downlink transmission, the transmission position is determined by a base station; for an uplink transmission provided with the dynamic grant, the transmission position is determined by a base station; and for an uplink transmission provided with the configured grant, the transmission position is determined by the UE); then a transmission with a higher priority needs to be transmitted. In this case, the determined transmission position of the transmission with a higher priority affects the transmission with a lower priority. For example, the transmission position of the transmission with a higher priority and the transmission position of the transmission with a lower priority have an entire or partial orthogonal frequency-division multiplexing (OFDM) symbol overlap in the time domain directly. In another example, the data preparation time of the transmission with a higher priority conflicts with the data preparation time of the transmission with a lower priority. In this case, only the data of the transmission with a higher priority is prepared. In another example, the data preparation time of the transmission with a higher priority and the transmission position of the transmission with a lower priority have an entire or partial OFDM overlap. The data preparation here may be regarded as a preparation in the mode of symbol-by-symbol pipelining. That is, a symbol is sent after being prepared. Meanwhile, the next symbol is prepared. For example, in FIG. 2(c), after the dynamic grant of the second transmission is received, the data of the second transmission is started to be prepared. At this point, after the dynamic grant of the second transmission is received, the data of the first transmission is still in preparation. If the capability of a UE is relatively low, the UE may prepare the data of only one transmission. Accordingly, the data preparation of the first transmission is interrupted after the dynamic grant of the second transmission so that the first transmission cannot be transmitted.

In one embodiment, the explanation for the first preset time and the second preset time may include the followings: In the case where the first transmission and the second transmission are each an uplink transmission, T1 denotes the time for processing the data of the first transmission and T3 denotes the time for processing the data of the second transmission (in one embodiment, the time for processing the data of the first transmission may also be understood as the time for preparing the data of the first transmission, and the time for processing the data of the second transmission may also be understood as the time for preparing the data of the second transmission). In the new radio (NR), N2 denotes the time for a UE processing the data (transmitted through a PUSCH). See TS38.214vf40. Moreover, N2 may have different values in different transmission conditions, for example, different subcarrier spacings and the cross-carrier scheduling transmission. Embodiments of the present application make a description using an example in which T1 and T3 are each N2. In general, for the same UE, the value of T1 is the same as the value of T3. However, in certain scenarios (for example, NR Rel-15), T1 and T3 are defined based on given values determined by the UE (mainly based on the values defined by the eMBB). Nonetheless, in the NR Rel-16, for the definition of T1 and the definition T3 to adapt to the URLLC, the value of T1 and the value of T3 may be reduced, likely resulting in that the time for the UE preparing a service with a lower priority is different from the time for the UE preparing a service with a higher priority. Accordingly, the value of T1 may be different from the value of T3. That is, the values are expressed as T1 and T3 respectively.

Alternatively, in the case where the first transmission and the second transmission are each an uplink transmission, T1 and T3 may also be determined as $T_{proc,2}$ defined in the NR. That is, T1 and T3 denote the second processing time $T_{proc,2}$. $T_{proc,2}$ specifies the minimum interval from the end where the UE receives an uplink grant to the starting position of the PUSCH corresponding to the uplink grant. That is, having received the uplink grant, the UE may start the PUSCH transmission after passing at least $T_{proc,2}$. Here the definition of $T_{proc,2}$ includes a plurality of parameters. Moreover, the value of the same parameter varies in different scenarios and may vary in different NR protocol versions. Alternatively, different parameters are included in the definition of $T_{proc,2}$ in different NR protocol versions (for example, new parameters are added). In the present application, T1 and T3 may be each equal to $T_{proc,2}$. In TS38.214vf40, $T_{proc,3}$=max$((N_2+d_{2,1})(2048+144) \cdot \kappa 2^{-\mu} \cdot T_c, d_{2,2})$. The parameter definitions here may refer to TS38.214vf40.

In one embodiment, X1 denotes the adjustment amount of T1 for fine-tuning the value of T1 and X denotes the adjustment amount of T3 for fine-tuning the value of T3. X1 and X are optional. That is, X1 and X are allowed to be always 0, indicating that the parameters X1 and X are ignored.

In the case where the first transmission and the second transmission are each an uplink transmission, D denotes the time D2 for canceling the processed first transmission or the processed second transmission. For example, D denotes the time for canceling a PUSCH that is being processed or the time for canceling a PUSCH that has been processed. In general, the value of D2 is 0. The canceling time is counted into other reference quantities. Moreover, a defined value may be given. For example, the defined value takes into consideration the UE with the worst capability or into consideration a very loose value that all devices can meet.

In one embodiment, in the case where the first transmission and the second transmission are each a downlink transmission, T1 denotes the time for processing the data of the first transmission and T3 denotes the time for processing the data of the second transmission (in one embodiment, the time for processing the data of the first transmission may also be understood as the time for decoding the data of the first transmission, and the time for processing the data of the second transmission may also be understood as the time for decoding the data of the second transmission). In the NR, N1 denotes the time for the UE processing the data (that is, the data transmitted through a PDSCH). See TS38.214vf40. Moreover, N1 may have different values in different transmission conditions.

Alternatively, in the case where the first transmission and the second transmission are each a downlink transmission, T1 and T3 may also be determined as $T_{proc,1}$ defined in the NR. That is, T1 and T3 denote the first processing time $T_{proc,1}$. $T_{proc,1}$ specifies the minimum interval from the end where the UE receives a PDSCH to the starting position of a PUCCH of the corresponding hybrid automatic repeat request-acknowledgment (HARQ-ACK) information. That is, having received the PDSCH, the UE may start the PUCCH transmission of the HARQ-ACK corresponding to the PDSCH after passing at least $T_{proc,1}$. Here the definition of $T_{proc,1}$ includes a plurality of parameters. Moreover, the value of the same parameter varies in different scenarios and may vary in different NR protocol versions. Alternatively, different parameters are included in the definition of $T_{proc,1}$ in different NR protocol versions (for example, new parameters are added). In the present application, T1 and T3 may be each equal to $T_{proc,1}$.

In one embodiment, X1 denotes the adjustment amount of T1 for fine-tuning the value of T1 and X denotes the adjustment amount of T3 for fine-tuning the value of T3. X1 and X are optional. That is, X1 and X are allowed to always be 0, indicating that the parameters X1 and X are ignored.

In the case where the first transmission and the second transmission are each a downlink transmission, D denotes the time D1 for canceling the processed first transmission or the processed second transmission. For example, D denotes the time for canceling a PDSCH that is being processed or the time for canceling a PDSCH that has been processed. In general, the value of D1 is 0. The canceling time is counted into other reference quantities. Moreover, a defined value may be given. For example, the defined value takes into consideration the UE with the worst capability or into consideration a very loose value that all devices can meet.

In one embodiment, T1, T3, X1, X, N2, N1, D1, and D2 may be each represented by an absolute duration or the number of orthogonal frequency-division multiplexing (OFDM) symbols. Here the absolute duration corresponding to one OFDM symbol in a given system is determinate.

Accordingly, the duration may be converted between the absolute duration and the number of symbols. Further, for the same parameter, a plurality of predefined values may be taken to correspond to different UE capabilities. For example, the N1 of a UE with a lower capability is represented by W1 symbols, and the N1 of a UE with a higher capability is represented by W2 symbols. Then the UE and the base station may select a corresponding value of the N1 based on their capabilities. Other parameters are similar.

In one embodiment, the first preset time further includes that the time point corresponding to the first preset time is postponed by Q symbols in the time domain or is advanced by M symbols in the time domain. The value of Q is determined according to the time for processing a physical downlink control channel (PDCCH) and/or the time for processing a physical downlink shared channel (PDSCH), and the value of M is determined according to the number of symbols occupied by a dynamic grant. Alternatively, the value of Q is an agreed value or 0, and the value of M is an agreed value or 0.

Some typical and exemplary embodiments are listed hereinafter. In these embodiments, the first preset time as T3+X and the second preset time as T1+X1 are used as an example.

In the first exemplary embodiment, the grant mode of the first transmission is a dynamic grant. The grant mode of the second transmission is a dynamic grant. The first transmission and the second transmission are each a downlink transmission. The priority of the first transmission is lower than the priority of the second transmission. For example, the first transmission corresponds to a PDSCH 1. The second transmission corresponds to a PDSCH 2.

Referring to FIG. 4, a base station first transmits the dynamic grant of the PDSCH 1 and then transmits the dynamic grant of the PDSCH 2. According to the dynamic grants, the starting position of the transmission of the PDSCH 1 is later than or equal to the position of T3+X before the starting position of the transmission of the PDSCH 2. (Here the position of T3+X before the starting position of the transmission of the PDSCH 2 (with a higher priority) is denoted as a point G. In FIG. 4, the point G corresponds exactly to the ending position of the dynamic grant of the second transmission. However, in fact, the point G may be later than the ending position of the dynamic grant of the second transmission. That is, the ending position of the dynamic grant of the second transmission is earlier than the point G. The point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the subcarrier spacing (SCS). That is, different SCSs correspond to different values of E.)) In this case, the base station cancels the transmission of the PDSCH 1. The PDSCH 2 is transmitted normally according to the dynamic grant of the PDSCH 2. The transmission of the PDSCH 1 and the transmission of the PDSCH 2 may overlap each other in the time domain or may not overlap each other.

As for a UE, the UE receives the dynamic grant of the PDSCH 1 and also the dynamic grant of the PDSCH 2. According to the dynamic grants, the starting position of the transmission of the PDSCH 1 is later than or equal to the point G. In this case, the UE on the receiving end considers that the transmission of the PDSCH 1 is canceled. The UE receives the transmission of the PDSCH 2. The first transmission and the second transmission may also be each provided with a configured grant. Alternatively, one of the first transmission and the second transmission may be provided with a configured grant. In this case, the processing is similar. That is, the starting position of the transmission of the PDSCH 1 is later than or equal to the point G (in the case where the second transmission is provided with a configured grant, the point G is determined at the position of T3+X before the arrival time point of the data of the second transmission, which is similar hereinafter). The base station and the UE agree that the transmission of the PDSCH 1 is canceled and that the PDSCH 2 is transmitted normally.

In one embodiment (referring to FIG. 5), in the case where the starting position of the transmission of the PDSCH 1 is later than or equal to the point G, the following processing may also be considered: when the starting position of the transmission of the PDSCH 1 is also at or after the position of T1+X1 after the ending position of the transmission of the PDSCH 2, the PDSCH 1 is transmitted normally. This is because the starting position of the PDSCH 1 is relatively late. After the transmission of the PDSCH 2 is ended and when at least a duration of T1+X1 passes after the transmission of the PDSCH 2 is ended, the PDSCH 1 starts to be transmitted. In this case, since the transmission of the PDSCH 2 is ended, the PDSCH 1 is transmitted completely.

In the second exemplary embodiment, the grant mode of the first transmission is a dynamic grant. The grant mode of the second transmission is a dynamic grant. The first transmission and the second transmission are each an uplink transmission. The priority of the first transmission is lower than the priority of the second transmission. For example, the first transmission corresponds to a PUSCH 1. The second transmission corresponds to a PUSCH 2.

Referring to FIG. 4, a base station first transmits the dynamic grant of the PUSCH 1 and then transmits the dynamic grant of the PUSCH 2. According to the dynamic grants, the starting position of the transmission of the PUSCH 1 is later than or equal to the position of T3+X before the starting position of the transmission of the PUSCH 2. (Here the position of T3+X before the starting position of the transmission of the PUSCH 2 (with a higher priority) is denoted as a point G. In FIG. 4, the point G corresponds exactly to the ending position of the dynamic grant of the second transmission. However, in fact, the point G may be later than the ending position of the dynamic grant of the second transmission. That is, the ending position of the dynamic grant of the second transmission is earlier than the point G. The point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station determines that the transmission of the PUSCH 1 is canceled. The PUSCH 2 is transmitted normally according to the dynamic grant of the PUSCH 2. The transmission of the PUSCH 1 and the transmission of the PUSCH 2 may overlap each other in the time domain or may not overlap each other. As for a UE, the UE receives the dynamic grant of the PUSCH 1 and also the dynamic grant of the PUSCH 2. According to the dynamic grants, the starting position of the transmission of the PUSCH 1 is later than or equal to the point G. In this case, the UE cancels the transmission of the PUSCH 1. The PUSCH 2 is transmitted normally. The first transmission and the second transmission may also be each provided with a configured grant. Alternatively, one of the first transmission and the second transmission may be provided with a configured grant. In this case, the processing is similar. That is, the starting position of the transmission of the PUSCH 1 is later than or equal to the point G (in the case where the second transmission is provided with a configured grant, the point G is determined at the position of T3+X before the arrival time point of the data of the second transmission, which is similar hereinafter). The base station and the UE agree that the transmission of the PUSCH 1 is canceled and that the PUSCH 2 is transmitted normally.

In one embodiment (referring to FIG. 5), in the case where the starting position of the transmission of the PUSCH 1 is later than or equal to the point G, the following processing may also be considered: when the starting position of the transmission of the PUSCH 1 is also at or after the position of T1+X1 after the ending position of the transmission of the PUSCH 2, the PUSCH 1 is transmitted normally. This is because the starting position of the PUSCH 1 is relatively late. After the transmission of the PUSCH 2 is ended and when at least a duration of T1+X1 passes after the transmission of the PUSCH 2 is ended, the PUSCH 1 starts to be transmitted. In this case, since the transmission of the PUSCH 2 is ended, the PUSCH 1 is transmitted completely.

In the third exemplary embodiment, the grant mode of the first transmission is a dynamic grant. The grant mode of the second transmission is a dynamic grant. The first transmission and the second transmission are each a downlink transmission. The priority of the first transmission is lower than the priority of the second transmission. For example, the first transmission corresponds to a PDSCH 1. The second transmission corresponds to a PDSCH 2.

Referring to FIGS. 2(*a*), 2(*b*), and 2(*c*), a base station first transmits the dynamic grant of the PDSCH 1 and then transmits the dynamic grant of the PDSCH 2. According to the dynamic grants, the starting position of the transmission of the PDSCH 1 is earlier than the position of T3+X before the starting position of the transmission of the PDSCH 2. (Here the position of T3+X before the starting position of the transmission of the PDSCH 2 (with a higher priority) is denoted as a point G. In FIGS. 2(*a*), 2(*b*), and 2(*c*), the point G corresponds exactly to the ending position of the dynamic grant of the second transmission. However, in fact, the point G may be later than the ending position of the dynamic grant of the second transmission. That is, the ending position of the dynamic grant of the second transmission is earlier than the point G. The point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station transmits the PDSCH 1 to (or at least to) the point G. (However, when the point G is later than the ending position of the transmission of PDSCH 1, the base station transmits the PDSCH 1 to the ending position of the PDSCH 1, as shown in FIG. 3. When the point G is earlier than the ending position of the transmission of the PDSCH 1, the base station transmits the PDSCH 1 to the point G.) Moreover, the base station cancels the transmission of the remaining PDSCH 1. The PDSCH 2 is normally transmitted. The transmission of the PDSCH 1 and the transmission of the PDSCH 2 may overlap each other in the time domain or may not overlap each other. As for a UE, the UE receives the dynamic grant of the PDSCH 1 and also the dynamic grant of the PDSCH 2. According to the dynamic grants, the starting position of the transmission of the PDSCH 1 is earlier than the point G. The UE on the receiving end considers that the PDSCH 1 is transmitted normally from the starting position of the transmission of the PDSCH 1 to (or at least to) the point G. (However, when the point G is later than the ending position of the transmission of the PDSCH 1, the UE on the receiving end determines that the PDSCH 1 is transmitted to the ending position of the PDSCH 1. When the point G is earlier than the ending position of the transmission of the PDSCH 1, the UE on the receiving end determines that the PDSCH 1 is transmitted to the point G.) The UE on the receiving end transmits the PDSCH 2 normally. The first transmission and the second transmission may also be each provided with a configured grant. Alternatively, one of the first transmission and the second transmission may be provided with a configured grant. In this case, the processing is similar. That is, the starting position of the transmission of the PDSCH 1 is earlier than the point G (in the case where the second transmission is provided with a configured grant, the point G is determined at the position of T3+X before the arrival time point of the data of the second transmission, which is similar hereinafter). The base station and the UE agree that the PDSCH 1 is transmitted normally from the starting position of the transmission of the PDSCH 1 to (or at least to) the point G and that the PDSCH 2 is transmitted normally.

In the fourth exemplary embodiment, the grant mode of the first transmission is a dynamic grant. The grant mode of the second transmission is a dynamic grant. The first transmission and the second transmission are each an uplink transmission. The priority of the first transmission is lower than the priority of the second transmission. For example, the first transmission corresponds to a PUSCH 1. The second transmission corresponds to a PUSCH 2.

Referring to FIGS. 2(*a*), 2(*b*), and 2(*c*), a base station first transmits the dynamic grant of the PUSCH 1 and then transmits the dynamic grant of the PUSCH 2. According to the dynamic grants, the starting position of the transmission of the PUSCH 1 is earlier than the position of T3+X before the starting position of the transmission of the PUSCH 2. (Here the position of T3+X before the starting position of the transmission of PUSCH 2 (with a higher priority) is denoted as a point G. In FIGS. 2(*a*), 2(*b*), and 2(*c*), the point G corresponds exactly to the ending position of the dynamic grant of the second transmission. However, in fact, the point G may be later than the ending position of the dynamic grant of the second transmission. That is, the ending position of the dynamic grant of the second transmission is earlier than the point G. The point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station determines that the PUSCH 1 is transmitted to (or at least to) the point G. (However, when the point G is later than the ending position of the transmission of the PUSCH 1, the base station determines that the PUSCH 1 is transmitted to the ending position of the PUSCH 1, as shown in FIG. 3. When the point G is earlier than the ending position of the transmission of the PUSCH 1, the base station considers that the PUSCH 1 is transmitted to the point G.) The base station determines that the transmission of the remaining PUSCH 1 is canceled. The PUSCH 2 is normally transmitted. The transmission of the PUSCH 1 and the transmission of the PUSCH 2 may overlap each other in the time domain or may not overlap each other. As for a UE, the UE receives the dynamic grant of the PUSCH 1 and also the dynamic grant of the PUSCH 2. According to the dynamic grants, the starting position of the transmission of the PUSCH 1 is earlier than the point G. The UE considers that the PUSCH 1 needs to be transmitted from the starting position of the transmission of the PUSCH 1 to (or at least to) the point G. (However, when the point G is later than the ending position of the transmission of the PUSCH 1, the receiving end determines that the PUSCH 1 is transmitted to the ending position of the PUSCH 1. When the point G is earlier than the ending position of the transmission of the PUSCH 1, the receiving end determines that the PUSCH 1 is transmitted to the point G.) The UE transmits the PUSCH 2 normally. The first transmission and the second transmission may also be each provided with a configured grant. Alternatively, one of the first transmission and the second transmission may be provided with a configured grant. In this case, the processing is similar. That is, the starting position of the transmission of the PUSCH 1 is earlier than the point G (in the case where the second transmission is provided with a configured grant, the point G is determined at the position of T3+X before the arrival time point of the data of the second transmission, which is similar hereinafter). The base station and the UE agree that the PUSCH 1 is transmitted normally from the starting position of the transmission of the PUSCH 1 to (or at least to) the point G and that the PUSCH 2 is transmitted normally.

In the fifth exemplary embodiment, the grant mode of the first transmission is a dynamic grant. The grant mode of the second transmission is a configured grant. The first transmission and the second transmission are each a downlink transmission. The priority of the first transmission is lower than the priority of the second transmission. For example, the first transmission corresponds to a PDSCH 1. The second transmission corresponds to a PDSCH 2.

Referring to FIG. 4, a base station transmits the dynamic grant of the PDSCH 1 and then determines that the dynamic grant of the PDSCH 2 needs to be transmitted. (The base station activates/configures the downlink transmission with the configured grant for a UE previously.) The base station transmits the PDSCH 2 according to the configured grant. The base station determines that the starting position (determined according to the dynamic grant of the PDSCH 1) of the transmission of the PDSCH 1 is later than or equal to the position of T3+X before the starting position (determined according to the configured grant of the PDSCH 2) of the transmission of the PDSCH 2. (Here the position of T3+X before the starting position of the transmission of the PDSCH 2 (with a higher priority) is denoted as a point G. In FIG. 4, the point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station cancels the transmission of the PDSCH 1. The PDSCH 2 is transmitted normally according to the configured grant of the PDSCH 2. The transmission of the PDSCH 1 and the transmission of the PDSCH 2 may overlap each other in the time domain or may not overlap each other. As for the UE, the UE receives the dynamic grant of the PDSCH 1 and needs to attempt to receive the PDSCH 2 according to the configured grant. The UE on the receiving end determines that the starting position of the transmission of the PDSCH 1 is later than or equal to the point G. When the UE receives the PDSCH 2 correctly, (it is because that after the configured grant is activated, the PDSCH 2 may be transmitted using the resource corresponding to the configured grant or may be not transmitted, therefore, the UE on the receiving end needs to attempt to receive the PDSCH 2), the UE on the receiving end considers that the transmission of the PDSCH 1 is canceled. Thus the UE on the receiving end receives the transmission of the PDSCH 2 according to the configured grant.

In one embodiment (referring to FIG. 5), in the case where the starting position of the transmission of PDSCH 1 is later than or equal to the point G, the following processing may also be considered: when the starting position of the transmission of the PDSCH 1 is also at or after the position of T1+X1 after the ending position of the transmission of the PDSCH 2, the PDSCH 1 is also transmitted normally. This is because the starting position of the PDSCH 1 is relatively late. After the transmission of the PDSCH 2 is ended and when at least a duration of T1+X1 passes after the transmission of the PDSCH 2 is ended, the PDSCH 1 starts to be transmitted. In this case, since the transmission of the PDSCH 2 is ended, the PDSCH 1 is transmitted completely.

In the sixth exemplary embodiment, the grant mode of the first transmission is a dynamic grant. The grant mode of the second transmission is a configured grant. The first transmission and the second transmission are each an uplink transmission. The priority of the first transmission is lower than the priority of the second transmission. For example, the first transmission corresponds to a PUSCH 1. The second transmission corresponds to a PUSCH 2.

Referring to FIG. 4, a base station transmits the dynamic grant of the PUSCH 1. The base station also activates/configures the uplink transmission with the configured grant for a UE previously and attempts to receive the transmission of the PUSCH 2 according to the configured grant. The base station determines that the starting position (determined according to the dynamic grant of the PUSCH 1) of the transmission of the PUSCH 1 is later than or equal to the position of T3+X before the starting position (determined according to the configured grant of the PUSCH 2) of the transmission of the PUSCH 2. When the base station determines that the PUSCH 2 is received correctly (since the PUSCH 2 is provided with the configured grant, the PUSCH 2 at the transmission position of the configured grant may be transmitted by the UE or not transmitted by the UE. Accordingly, the base station needs to attempt to receive the PUSCH 2 to determine whether the PUSCH 2 is actually sent. The PUSCH 1 may be affected only when the UE actually sends the PUSCH 2.) (here the position of T3+X before the starting position of the transmission of the PUSCH 2 (with a higher priority) is denoted as a point G. In FIG. 4, the point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)), the base station determines that the transmission of the PUSCH 1 is canceled and the PUSCH 2 is transmitted normally according to the configured grant of the PUSCH 2. The transmission of the PUSCH 1 and the transmission of the PUSCH 2 may overlap each other in the time domain or may not overlap each other. As for the UE, the UE receives the dynamic grant of the PUSCH 1 and then discovers that the PUSCH 2 needs to be transmitted. Moreover, the UE attempts to use the configured grant to transmit the PUSCH 2. The receiving end determines that the starting position of the transmission of the PUSCH 1 is later than or equal to the point G. In this case, the UE cancels the transmission of the PUSCH 1 and thus transmits the PUSCH 2 according to the configured grant.

In one embodiment (referring to FIG. 5), in the case where the starting position of the transmission of the PUSCH 1 is later than or equal to the point G, the following processing may also be considered: when the starting position of the transmission of the PUSCH 1 is also at or after the position of T1+X1 after the ending position of the transmission of the PUSCH 2, the PUSCH 1 is transmitted normally. This is because the starting position of the PUSCH 1 is relatively late. After the transmission of the PUSCH 2 is ended and when at least a duration of T1+X1 passes after the transmission of the PUSCH 2 is ended, the PUSCH 1 starts to be transmitted. In this case, since the transmission of the PUSCH 2 is ended, the PUSCH 1 is transmitted completely.

In the seventh exemplary embodiment, the grant mode of the first transmission is a configured grant, and the grant mode of the second transmission is a dynamic grant. The first transmission and the second transmission are each a downlink transmission. The priority of the first transmission is lower than the priority of the second transmission. For example, the first transmission corresponds to a PDSCH 1. The second transmission corresponds to a PDSCH 2.

Referring to FIG. 4, a base station determines that the PDSCH 1 needs to be transmitted (the base station activates/configures the downlink transmission with the configured grant for a UE previously). The base station transmits the PDSCH 1 according to the configured grant and then transmits the dynamic grant of the PDSCH 2. The base station determines that the starting position (determined according to the configured grant of the PDSCH 1) of the transmission of the PDSCH 1 is later than or equal to the position of T3+X before the starting position (determined according to the dynamic grant of the PDSCH 2) of the transmission of the PDSCH 2. (Here the position of T3+X before the starting position of the transmission of the PDSCH 2 (with a higher priority) is denoted as a point G. In FIG. 4, the point G corresponds exactly to the ending position of the dynamic grant of the second transmission. However, in fact, the point G may be later than the ending position of the dynamic grant of the second transmission. That is, the sending position of the dynamic grant of the second transmission is earlier than the point G. The point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station cancels the transmission of the PDSCH 1. The PDSCH 2 is transmitted normally according to the dynamic grant of the PDSCH 2. The transmission of the PDSCH 1 and the transmission of the PDSCH 2 may overlap each other in the time domain or may not overlap each other. As for the UE, the UE receives the PDSCH 1 with the configured grant activated/configured and receives the dynamic grant of the PDSCH 2. The UE on the receiving end determines that the starting position of the transmission of the PDSCH 1 (that is, the starting position of possible transmission of the PDSCH 1 determined according to the configured grant) is later than or equal to the point G. In this case, the UE on the receiving end considers that the transmission of the PDSCH 1 is canceled. Thus the UE on the receiving end receives the transmission of the PDSCH 2 according to the dynamic grant.

In one embodiment (referring to FIG. 5), in the case where the starting position of the transmission of the PDSCH 1 is later than or equal to the point G, the following processing may also be considered: when the starting position of the transmission of the PDSCH 1 is also at or after the position of T1+X1 after the ending position of the transmission of the PDSCH 2, the PDSCH 1 is also transmitted normally. This is because the starting position of the PDSCH 1 is relatively late. After the transmission of the PDSCH 2 is ended and when at least a duration of T1+X1 passes after the transmission of the PDSCH 2 is ended, the PDSCH 1 starts to be transmitted. In this case, since the transmission of the PDSCH 2 is ended, the PDSCH 1 is transmitted completely.

In the eighth exemplary embodiment, the grant mode of the first transmission is a configured grant. The grant mode of the second transmission is a dynamic grant. The first transmission and the second transmission are each an uplink transmission. The priority of the first transmission is lower than the priority of the second transmission. For example, the first transmission corresponds to a PUSCH 1. The second transmission corresponds to a PUSCH 2.

Referring to FIG. 4, a base station activates/configures the uplink transmission with the configured grant for a UE previously and needs to attempt to receive the transmission of the PUSCH 1 according to the configured grant. The base station transmits the dynamic grant of the PUSCH 2. The base station determines that the starting position (determined according to the configured grant of PUSCH 1) of the transmission of the PUSCH 1 is later than or equal to the position of T3+X before the starting position of the transmission of the PUSCH 2. (Here the position of T3+X before the starting position of the transmission of the PUSCH 2 (with a higher priority) is denoted as a point G. In FIG. 4, the point G corresponds exactly to the ending position of the dynamic grant of the second transmission. However, in fact, the point G may be later than the ending position of the dynamic grant of the second transmission. That is, the sending position of the dynamic grant of the second transmission is earlier than the point G. The point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station determines that the transmission of the PUSCH 1 is canceled. The PUSCH 2 is transmitted normally according to the dynamic grant of the PUSCH 2. The transmission of the PUSCH 1 and the transmission of the PUSCH 2 may overlap each other in the time domain or may not overlap each other. As for the UE, the UE discovers that the PUSCH 1 needs to be transmitted, plans to use the configured grant to transmit the PUSCH 1, and receives the dynamic grant of the PUSCH 2. The UE determines that the starting position of the transmission of the PUSCH 1 is later than or equal to the point G. In this case, the UE cancels the transmission of the PUSCH 1 and thus sends the transmission of the PUSCH 2 according to the dynamic grant.

In one embodiment (referring to FIG. 5), in the case where the starting position of the transmission of the PUSCH 1 is later than or equal to the point G, the following processing may also be considered: when the starting position of the transmission of the PUSCH 1 is also at or after the position of T1+X1 after the ending position of the transmission of the PUSCH 2, the PUSCH 1 is also transmitted normally. This is because the starting position of the PUSCH 1 is relatively late. After the transmission of the PUSCH 2 is ended and when at least a duration of T1+X1 passes after the transmission of the PUSCH 2 is ended, the PUSCH 1 starts to be transmitted. In this case, since the transmission of the PUSCH 2 is ended, the PUSCH 1 is transmitted completely.

In the ninth exemplary embodiment, the grant mode of the first transmission is a dynamic grant. The grant mode of the second transmission is a configured grant. The first transmission and the second transmission are each a downlink transmission. The priority of the first transmission is lower than the priority of the second transmission. For example, the first transmission corresponds to a PDSCH 1. The second transmission corresponds to a PDSCH 2.

Referring to FIGS. 2(*a*), 2(*b*), and 2(*c*), a base station first transmits the dynamic grant of the PDSCH 1 and then determines that the PDSCH 2 needs to be transmitted according to the configured grant. (The base station activates/configures the configured grant for a UE previously.) The base station determines that the starting position of the transmission of the PDSCH 1 is earlier than the position of T3+X before the starting position of the transmission of the PDSCH 2. (Here the position of T3+X before the starting position of the transmission of the PDSCH 2 (with a higher priority) is denoted as a point G. In FIGS. 2(*a*), 2(*b*), and 2(*c*), the point G may also be moved to the left (to increase the T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station transmits the PDSCH 1 to (or at least to) the point G. (However, when the point G is later than the ending position of the transmission of the PDSCH 1, the base station transmits the PDSCH 1 to the ending position of the PDSCH 1, as shown in FIG. 3. When the point G is earlier than the ending position of the transmission of the PDSCH 1, the base station transmits the PDSCH 1 to the point G.) The base station cancels the transmission of the remaining PDSCH 1. The PDSCH 2 is normally transmitted. The transmission of the PDSCH 1 and the transmission of the PDSCH 2 may overlap each other in the time domain or may not overlap each other. As for the UE, the UE receives the dynamic grant of the PDSCH 1. Moreover, since the UE is activated/configured with the configured grant for performing the downlink transmission, the UE attempts to receive the PDSCH 2 according to the configured grant. When the starting position of the transmission of the PDSCH 1 is earlier than the point G and the UE receives the PDSCH 2 correctly, the receiving end considers that the PDSCH 1 is transmitted normally from the starting position of the PDSCH 1 to (or at least to) the point G. (However, when the point G is later than the ending position of the transmission of the PDSCH 1, the receiving end determines that the PDSCH 1 is transmitted to the ending position of the PDSCH 1. When the point G is earlier than the ending position of the transmission of the PDSCH 1, the receiving end determines that the PDSCH 1 is transmitted to the point G.) The transmission of the remaining PDSCH 1 is canceled. When the UE does not receive PDSCH 2 correctly, the UE considers that the PDSCH 2 is not transmitted. In this case, the PDSCH 1 is transmitted correctly. Alternatively, the UE considers that the PDSCH 2 is transmitted but wrongly decoded. In this case, part of the PDSCH 1 is transmitted.

Here in the case where the PDSCH 2 is transmitted, and the starting position of the PDSCH 1 earlier than the point G is still used, the base station and the UE agree that the PDSCH 1 is transmitted from the starting position of the PDSCH 1 to (or at least to) the point G, that the remaining PDSCH 1 is not transmitted, and that the PDSCH 2 is transmitted normally. It is to be noted that when the point G is later than the ending position of the transmission of the PDSCH 1, the receiving end determines that the PDSCH 1 is transmitted to the ending position of the PDSCH 1. When the point G is earlier than the ending position of the transmission of the PDSCH 1, the receiving end determines that the PDSCH 1 is transmitted to the point G.

In the tenth exemplary embodiment, the grant mode of the first transmission is a dynamic grant. The grant mode of the second transmission is a configured grant. The first transmission and the second transmission are each an uplink transmission. The priority of the first transmission is lower than the priority of the second transmission. For example, the first transmission corresponds to a PUSCH 1. The second transmission corresponds to a PUSCH 2.

Referring to FIGS. 2(*a*), 2(*b*), and 2(*c*), a base station first transmits the dynamic grant of the PUSCH 1. Moreover, the base station activates/configures the configured grant for the uplink transmission. In this case, a UE may use the configured grant to transmit the PUSCH 2. (Whether to transmit depends on whether the UE has the data of PUSCH 2 for transmitting.) When the starting position of the transmission of the PUSCH 1 is earlier than the position of T3+X before the starting position of the transmission of the PUSCH 2, (here the position of T3+X before the starting position of the transmission of the PUSCH 2 (with a higher priority) is denoted as a point G. In FIGS. 2(*a*), 2(*b*), and 2(*c*), the point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) the base station determines that the PUSCH 1 is transmitted to (or at least to) a point G (when the point G is later than the ending position of the transmission of the PUSCH 1, the base station determines that the PUSCH 1 is transmitted to the ending position of the PUSCH 1, as shown in FIG. 3. When the point G is earlier than the ending position of the transmission of the PUSCH 1, the base station considers that the PUSCH 1 is transmitted to the point G.) Whether the remaining PUSCH 1 (after the point G) is transmitted depends on whether the PUSCH 2 is transmitted by the UE. When the UE has the PUSCH 2 for transmitting, the PUSCH 2 is transmitted normally. In this case, the transmission of the remaining PUSCH 1 is canceled. The transmission of the PUSCH 1 and the transmission of the PUSCH 2 may overlap each other in the time domain or may not overlap each other. As for the UE, the UE receives the dynamic grant of the PUSCH 1. Moreover, the UE is activated/configured with the configured grant for performing the uplink transmission. If the UE determines that the PUSCH 2 needs to be transmitted and that the starting position of the transmission of the PUSCH 1 is earlier than the point G, the PUSCH 1 is transmitted from the starting position of the PUSCH 1 to (or at least to) the point G. The transmission of the remaining PUSCH 1 is canceled. The PUSCH 2 is transmitted normally according to the configured grant. If the UE determines that no PUSCH 2 needs to be transmitted, the UE transmits the PUSCH 1 according to the dynamic grant.

In the eleventh exemplary embodiment, the grant mode of the first transmission is a configured grant. The grant mode of the second transmission is a dynamic grant. The first transmission and the second transmission are each a downlink transmission. The priority of the first transmission is lower than the priority of the second transmission. For example, the first transmission corresponds to a PDSCH 1. The second transmission corresponds to a PDSCH 2.

Referring to FIGS. 2(*a*), 2(*b*), and 2(*c*), a base station transmits the dynamic grant of the PDSCH 2 and determines that the PDSCH 1 needs to be transmitted according to the configured grant. (The base station activates/configures the configured grant for a UE previously.) The base station determines that the starting position of the transmission of the PDSCH 1 is earlier than the position of T3+X before the starting position of the transmission of the PDSCH 2. (Here the position of T3+X before the starting position of the transmission of the PDSCH 2 (with a higher priority) is denoted as a point G. In FIGS. 2(*a*), 2(*b*), and 2(*c*), the point G corresponds exactly to the ending position of the dynamic grant of the second transmission. However, in fact, the point G may be later than the ending position of the dynamic grant of the second transmission. That is, the sending position of the dynamic grant of the second transmission is earlier than the point G. The point G may also be moved to the left (to increase T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)) In this case, the base station transmits the PDSCH 1 to (or at least to) the point G. (However, when the point G is later than the ending position of the transmission of the PDSCH 1, the base station transmits the PDSCH 1 to the ending position of the PDSCH 1, as shown in FIG. 3. When the point G is earlier than the ending position of the transmission of the PDSCH 1, the base station transmits the PDSCH 1 to the point G.) The base station cancels the transmission of the remaining PDSCH 1. The PDSCH 2 is normally transmitted. The transmission of the PDSCH 1 and the transmission of the PDSCH 2 may overlap each other in the time domain or may not overlap each other. As for the UE, the UE receives the dynamic grant of the PDSCH 2. Since the UE is activated/configured with the configured grant for performing the downlink transmission, the UE attempts to receive the PDSCH 1 according to the configured grant. If the starting position of the transmission of the PDSCH 1 is earlier than the point G and the UE receives the PDSCH 2 correctly, the receiving end considers that the PDSCH 1 is transmitted normally from the starting position of the PDSCH 1 to (or at least to) the point G. (However, if the point G is later than the ending position of the transmission of the PDSCH 1, the UE on the receiving end determines that the PDSCH 1 is transmitted to the ending position of the PDSCH 1. If the point G is earlier than the ending position of the transmission of the PDSCH 1, the UE on the receiving end determines that the PDSCH 1 is transmitted to the point G.) and the transmission of the remaining PDSCH 1 is canceled. If the UE does not receive the PDSCH 2 correctly, the UE considers that the PDSCH 2 is not transmitted. In this case, the PDSCH 1 is transmitted correctly. Alternatively, the UE considers that the PDSCH 2 is transmitted but wrongly decoded. In this case, part of the PDSCH 1 is transmitted.

Here in the case where the PDSCH 1 is transmitted and the starting position of the PDSCH 1 earlier than the point G is still used, the base station and the UE agree that the PDSCH 1 is transmitted from the starting position of the PDSCH 1 to (or at least to) the point G, that the remaining PDSCH 1 is not transmitted, and that the PDSCH 2 is transmitted normally. It is to be noted that when the point G is later than the ending position of the transmission of the PDSCH 1, the receiving end determines that the PDSCH 1 is transmitted to the ending position of the PDSCH 1. When the point G is earlier than the ending position of the transmission of the PDSCH 1, the receiving end determines that the PDSCH 1 is transmitted to the point G.

In the twelfth exemplary embodiment, the grant mode of the first transmission is a configured grant. The grant mode of the second transmission is a dynamic grant. The first transmission and the second transmission are each an uplink transmission. The priority of the first transmission is lower than the priority of the second transmission. For example, the first transmission corresponds to a PUSCH 1. The second transmission corresponds to a PUSCH 2.

Referring to FIGS. 2(*a*), 2(*b*), and 2(*c*), a base station transmits the dynamic grant of the PUSCH 2. Moreover, the base station activates/configures the configured grant for the uplink transmission. In this case, a UE may use the configured grant to transmit the PUSCH 1. (Whether to transmit depends on whether the UE has the data of PUSCH 1 for transmitting.) If the starting position of the transmission of the PUSCH 1 is earlier than the position of T3+X before the starting position of the transmission of the PUSCH 2, (here the position of T3+X before the starting position of the transmission of the PUSCH 2 (with a higher priority) is denoted as a point G. In FIGS. 2(*a*), 2(*b*), and 2(*c*), the point G corresponds exactly to the ending position of the dynamic grant of the second transmission. However, in fact, the point G may be later than the ending position of the dynamic grant of the second transmission. That is, the sending position of the dynamic grant of the second transmission is earlier than the point G. The point G may also be moved to the left (to increase the T3+X since the determined duration of T3+X is relatively short according to the direction in the figure) from the position of T3+X before the starting position of the second transmission by E symbols. (E denotes a predetermined value and may be 1 or 2 with reference to the process of canceling one PDSCH or one PUSCH. The value of E may also be bound to the SCS. That is, different SCSs correspond to different values of E.)), the base station considers that the PUSCH 1 is transmitted to (or at least to) a point G. (However, if the point G is later than the ending position of the transmission of the PUSCH 1, the base station determines that the PUSCH 1 is transmitted to the ending position of the PUSCH 1, as shown in FIG. 3. If the point G is earlier than the ending position of the transmission of the PUSCH 1, the base station considers that the PUSCH 1 is transmitted to the point G.) Whether the remaining PUSCH 1 (after the point G) is transmitted depends on whether the PUSCH 2 is transmitted by the UE. If the UE has the PUSCH 2 for transmitting, the PUSCH 2 is transmitted normally. In this case, the transmission of the remaining PUSCH 1 is canceled. The transmission of the PUSCH 1 and the transmission of the PUSCH 2 may overlap each other in the time domain or may not overlap each other. As for the UE, the UE receives the dynamic grant of the PUSCH 2. The UE is activated/configured with the configured grant for performing the uplink transmission and determines that the PUSCH 1 needs to be transmitted. Accordingly, the UE determines that the starting position of the transmission of the PUSCH 1 is earlier than the point G. PUSCH 1 is transmitted from the starting position of PUSCH 1 to (or at least to) the point G. The transmission of the remaining PUSCH 1 is canceled. The PUSCH 2 is transmitted normally according to the dynamic grant.

All the preceding exemplary embodiments use an example in which the first preset time is T3+X and the second preset time is T1+X1 for description.

The thirteenth exemplary embodiment is further provided below.

Referring to FIGS. 2 to 5, the method may be described as multiple transmission services for one UE. (For example, two transmissions with different priorities are illustrated in FIGS. 2 to 5. The two transmissions may overlap each other in the time domain. Alternatively, the dynamic grant of one transmission may overlap the dynamic grant of the other transmission in the time domain.)

The starting position of the first transmission is earlier than the ending position of the dynamic grant of the second transmission (or earlier than the starting position of the dynamic grant of the second transmission, or earlier than the position to which the ending position of the dynamic grant of the second transmission is postponed by Q1 symbols). In this case, the first transmission is transmitted from the starting position of the first transmission to a position A.

The determination of the position A may be in one of the manners below.

The determination of the position A is as follows: selecting the earlier one between the ending position of the dynamic grant of the second transmission and the ending position of the first transmission. (Various descriptions may exist here. The essence is that: as for the ending position of the first transmission earlier than the ending position of the dynamic grant of the second transmission, the first transmission is transmitted completely; as for the ending position of the first transmission later than the ending position of the dynamic grant of the second transmission, the first transmission is transmitted from the starting position of the first transmission to the ending position of the dynamic grant of the second transmission.)

Alternatively, the determination of the position A is as follows: selecting the earlier one between the starting position of the dynamic grant of the second transmission and the ending position of the first transmission. (Various descriptions may exist here. The essence is that: as for the ending position of the first transmission earlier than the starting position of the dynamic grant of the second transmission, the first transmission is transmitted completely; as for the ending position of the first transmission later than the starting position of the dynamic grant of the second transmission, the first transmission is transmitted from the starting position of the first transmission to the starting position of the dynamic grant of the second transmission.)

Alternatively, the determination of the position A is as follows: selecting the earlier one between the position to which the ending position of the dynamic grant of the second transmission is postponed by Q1 symbols and the ending position of the first transmission. (Various descriptions may exist here. The essence is that: as for the ending position of the first transmission earlier than the position to which the ending position of the dynamic grant of the second transmission is postponed by Q1 symbols, the first transmission is transmitted completely; as for the ending position of the first transmission later than the position to which the ending position of the dynamic grant of the second transmission is postponed by Q1 symbols, the first transmission is transmitted from the starting position of the first transmission to the position to which the ending position of the dynamic grant of the second transmission is postponed by Q1 symbols.) That is, the first transmission is either transmitted completely or transmitted to the position to which the ending position of the dynamic grant of the second transmission is postponed by Q1 symbols.

The ending position of the dynamic grant of the second transmission (or the starting position of the dynamic grant of the second transmission, or the position to which the ending position of the dynamic grant of the second transmission is postponed by Q1 symbols) is earlier than the starting position of the first transmission. In this case, the transmission of the first transmission is canceled.

The value of Q1 is determined with reference to at least one of the time for a UE decoding a PDCCH or the time for canceling the data processing (including the time for canceling data preparation in an uplink transmission and the time for canceling data decoding in the downlink transmission). Alternatively, Q1 is predefined as a fixed value, for example, 1, 2, or 3.

In one embodiment, the priority of the second transmission is higher than the priority of the first transmission. The second transmission is always transmitted based on a dynamic grant or a configured grant. The first transmission and the second transmission may be not provided with a dynamic grant. That is, the first transmission and the second transmission are each provided with a configured grant in this case. If the first transmission and the second transmission are each provided with a dynamic grant, the dynamic grant of the first transmission is transmitted prior to the dynamic grant of the second transmission. If the first transmission and the second transmission are each provided with a configured grant, the arrival time point (the determined transmission time point) of the data of the first transmission is earlier than the arrival time point of the data of the second transmission. For a transmission provided with a configured grant, the starting position of the transmission or the ending position of the transmission is determined according to the configured grant.

When the grant mode of the second transmission is a configured grant, in the preceding embodiments, the dynamic grant related to the second transmission is replaced with the arrival time point of the data of the second transmission. In this case, both the starting position of the dynamic grant of the second transmission and the ending position of the dynamic grant of the second transmission correspond to the arrival time point of the data of the second transmission.

The first transmission and the second transmission may be both uplink transmissions or both downlink transmissions. Alternatively, one of the first transmission and the second transmission may be an uplink transmission, and the other of the first transmission and the second transmission may be a downlink transmission. The first transmission and the second transmission may be in two carriers respectively or may be in the same carrier.

When a plurality of transmissions exist in the same UE, the transmission position of a transmission with a lower priority is determined first (either provided with a dynamic grant or through a configured grant; for a downlink transmission, the transmission position is determined by a base station; for an uplink transmission provided with a dynamic grant, the transmission position is determined by a base station; for an uplink transmission provided with a configured grant, the transmission position is determined by the UE); then a transmission with a higher priority needs to be transmitted. In this case, the determined transmission position of the transmission with a higher priority affects the transmission with a lower priority or the data preparation of the transmission with a lower priority. For example, the transmission position of the transmission with a higher priority and the transmission position of the transmission with a lower priority have an entire or partial OFDM symbol overlap in the time domain directly. In another example, the data preparation time of the transmission with a higher priority conflicts with the data preparation time of the transmission with a lower priority. In this case, only the data of the transmission with a higher priority is prepared. In another example, the data preparation time of the transmission with a higher priority and the transmission position of the transmission with a lower priority have an entire or partial OFDM overlap. The data preparation here may be regarded as a preparation in the mode of symbol-by-symbol pipelining. That is, a symbol is sent after being prepared. Meanwhile, the next symbol is prepared. For example, in FIG. 2(c), after the dynamic grant of the second transmission is received, the data of the second transmission is started to be prepared. At this point, after the dynamic grant of the second transmission is received, the data of the first transmission is still in preparation. If the capability of a UE is relatively low, the UE may prepare the data of only one transmission. Accordingly, the data preparation of the first transmission is interrupted after the dynamic grant of the second transmission so that the first transmission cannot be transmitted.

Figure 7:
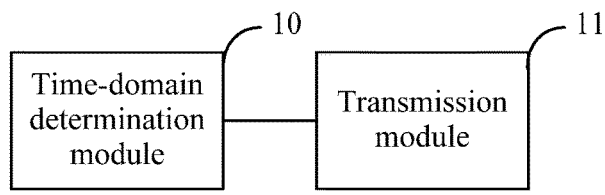
FIG. 7 is a diagram illustrating the structure of an apparatus for transmission processing according to an embodiment.

FIG. 7 is a diagram illustrating the structure of an apparatus for transmission processing according to an embodiment. The apparatus for transmission processing may be configured to a sending end. As shown in FIG. 7, the apparatus includes a time-domain determination module and a transmission module 11. The time-domain determination module 10 is configured to determine for at least two transmissions that the starting position of a first transmission is earlier than a point G. The transmission module 11 is configured to transmit the first transmission from the starting position of the first transmission to the point G or transmit the first transmission from the starting position of the first transmission to the ending position of the first transmission.

In this embodiment, the point G is a time point of first preset time before the starting position of the second transmission.

The apparatus for transmission processing provided by this embodiment is used for implementing the method for transmission processing of the embodiment shown in FIG. 1. The implementation principles and technical effects of the apparatus for transmission processing provided by this embodiment are similar and are not repeated here.

In one embodiment, the priority of the first transmission is lower than the priority of the second transmission.

In one embodiment, the transmission module 11 is configured to transmit the first transmission from the starting position of the first transmission to the ending position of the first transmission in the case where the point G is later than or equal to the ending position of the first transmission.

Figure 8:
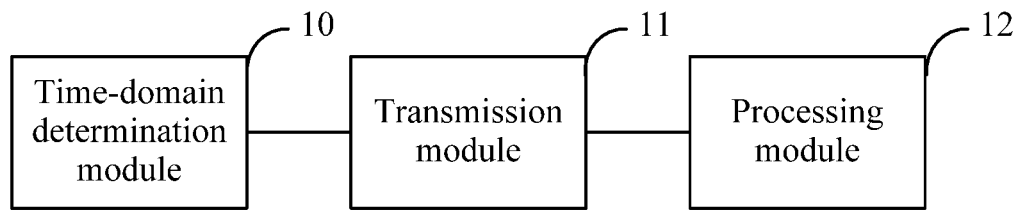
FIG. 8 is a diagram illustrating the structure of another apparatus for transmission processing according to an embodiment.

In an embodiment, in conjunction with FIG. 7, FIG. 8 is a diagram illustrating the structure of another apparatus for transmission processing according to an embodiment. The apparatus further includes a processing module 12.

The processing module 12 is configured to cancel the transmission of the first transmission in the case where the starting position of the first transmission is later than or equal to the point G.

The transmission module 11 is further configured to transmit the first transmission from the starting position of the first transmission to the ending position of the first transmission in the case where the starting position of the first transmission is later than or equal to the point G and later than or equal to a point H.

In this embodiment, the point H is a time point of second preset time after the ending position of the second transmission.

In one embodiment, the first preset time is T3, T3+X, or T3+X+D; and the second preset time is T1 or T1+X1.

In one embodiment, in the case where the first transmission and the second transmission are each an uplink transmission, T1 and T3 denote the time N2 for processing the data of the first transmission and the time N2 for processing the data of the second transmission respectively, or T1 and T3 denote the processing time $T_{proc,2}$; and D denotes the time D2 for canceling the processed first transmission or the processed second transmission.

In one embodiment, in the case where the first transmission and the second transmission are each a downlink transmission, T1 and T3 denote the time N1 for processing the data of the first transmission and the time N1 for processing the data of the second transmission respectively, or T1 and T3 denote the processing time $T_{proc,1}$; and D denotes the time D1 for canceling the processed first transmission or the processed second transmission.

X1 and X denote the adjustment amount of T1 and the adjustment amount of T3 respectively.

In one embodiment, the value of D1 is 0; the value of D2 is 0; the value of X1 is 0; and the value of X is 0.

In one embodiment, the first preset time further includes that the time point corresponding to the first preset time is postponed by Q symbols in the time domain or is advanced by M symbols in the time domain.

In one embodiment, the value of Q is determined according to at least one of the time for processing a physical downlink control channel (PDCCH) or the time for processing a physical downlink shared channel (PDSCH), and the value of M is determined according to the number of symbols occupied by a dynamic grant. Alternatively, the value of Q is an agreed value or 0, and the value of M is an agreed value or 0.

In one embodiment, the first transmission is an uplink transmission or a downlink transmission. The second transmission is an uplink transmission or a downlink transmission.

The first transmission and the second transmission are in the same carrier or different carriers.

The grant mode of the first transmission is a dynamic grant or a configured grant. The grant mode of the second transmission is a dynamic grant or a configured grant.

The first transmission overlaps the second transmission in the time domain.

In one embodiment, in the case where the first transmission and the second transmission are each provided with a dynamic grant, the dynamic grant of the first transmission is prior to the dynamic grant of the second transmission.

In the case where the first transmission and the second transmission are each provided with a configured grant, the determined transmission time of the first transmission is earlier than the determined transmission time of the second transmission.

Figure 9:
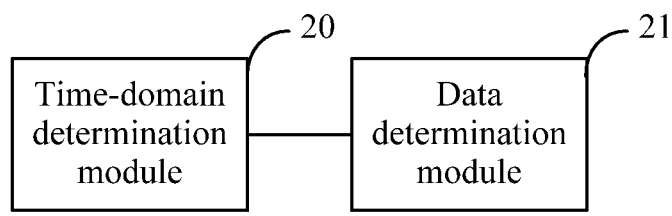
FIG. 9 is a diagram illustrating the structure of another apparatus for transmission processing according to an embodiment.

FIG. 9 is a diagram illustrating the structure of another apparatus for transmission processing according to an embodiment. The apparatus for transmission processing may be configured to a receiving end. As shown in FIG. 9, the apparatus includes a time-domain determination module and a data determination module 21. The time-domain determination module 20 is configured to determine for at least two transmissions that the starting position of a first transmission is earlier than a point G. The data determination module 21 is configured to determine that the first transmission is transmitted from the starting position of the first transmission to the point G or from the starting position of the first transmission to the ending position of the first transmission In this embodiment, the point G is a time point of first preset time before the starting position of the second transmission.

The apparatus for transmission processing provided by this embodiment is used for implementing the method for transmission processing of the embodiment shown in FIG. 6. The implementation principles and technical effects of the apparatus for transmission processing provided by this embodiment are similar and are not repeated here.

In one embodiment, the priority of the first transmission is lower than the priority of the second transmission.

In one embodiment, the data determination module 21 is configured to determine, in the case where the point G is later than or equal to the ending position of the first transmission, that the first transmission is transmitted from the starting position of the first transmission to the ending position of the first transmission.

Figure 10:
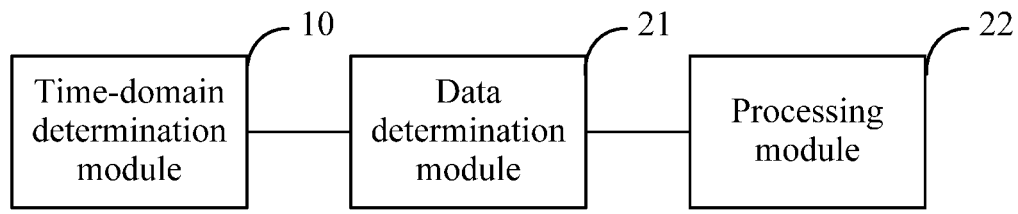
FIG. 10 is a diagram illustrating the structure of another apparatus for transmission processing according to an embodiment.

In an embodiment, in conjunction with FIG. 9, FIG. 10 is a diagram illustrating the structure of another apparatus for transmission processing according to an embodiment. The apparatus further includes a processing module 22.

The processing module 22 is configured to cancel the transmission of the first transmission in the case where the starting position of the first transmission is later than or equal to the point G.

The transmission module 21 is further configured to determine, in the case where the starting position of the first transmission is later than or equal to the point G and later than or equal to a point H, that the first transmission is transmitted from the starting position of the first transmission to the ending position of the first transmission.

In this embodiment, the point H is a time point of second preset time after the ending position of the second transmission.

In one embodiment, the first preset time is T3, T3+X, or T3+X+D; and the second preset time is T1 or T1+X1.

In one embodiment, in the case where the first transmission and the second transmission are each an uplink transmission, T1 and T3 denote the time N2 for processing the data of the first transmission and the time N2 for processing the data of the second transmission respectively, or T1 and T3 denote the processing time $T_{proc,2}$ and D denotes the time D2 for canceling the processed first transmission or the processed second transmission.

In one embodiment, in the case where the first transmission and the second transmission are each a downlink transmission, T1 and T3 denote the time N1 for processing the data of the first transmission and the time N1 for processing the data of the second transmission respectively, or T1 and T3 denote the processing time $T_{proc,1}$; and D denotes the time D1 for canceling the processed first transmission or the processed second transmission.

X1 and X denote the adjustment amount of T1 and the adjustment amount of T3 respectively.

In one embodiment, the value of D1 is 0; the value of D2 is 0; the value of X1 is 0; and the value of X is 0.

In one embodiment, the first preset time further includes that the time point corresponding to the first preset time is postponed by Q symbols in the time domain or is advanced by M symbols in the time domain.

In one embodiment, the value of Q is determined according to at least one of the time for processing a physical downlink control channel (PDCCH) or the time for processing a physical downlink shared channel (PDSCH), and the value of M is determined according to the number of symbols occupied by a dynamic grant. Alternatively, the value of Q is an agreed value or 0, and the value of M is an agreed value or 0.

In one embodiment, the first transmission is an uplink transmission or a downlink transmission. The second transmission is an uplink transmission or a downlink transmission.

The first transmission and the second transmission are in the same carrier or different carriers.

The grant mode of the first transmission is a dynamic grant or a configured grant. The grant mode of the second transmission is a dynamic grant or a configured grant.

The first transmission overlaps the second transmission in the time domain.

In one embodiment, in the case where the first transmission and the second transmission are each provided with a dynamic grant, the dynamic grant of the first transmission is prior to the dynamic grant of the second transmission.

In the case where the first transmission and the second transmission are each provided with a configured grant, the determined transmission time of the first transmission is earlier than the determined transmission time of the second transmission.

Figure 11:
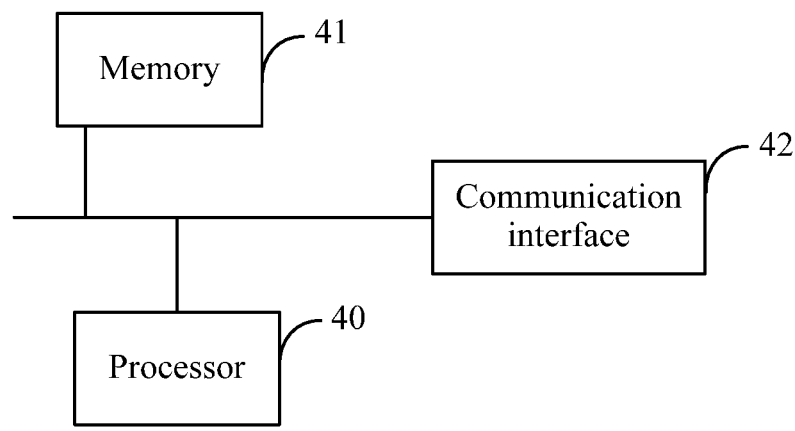
FIG. 11 is a diagram illustrating the structure of a base station according to an embodiment.

FIG. 11 is a diagram illustrating the structure of a base station according to an embodiment. As shown in FIG. 11, the base station includes a processor 40, a memory 41, and a communication interface 42. One or more processors 40 may be provided in the base station, and one processor is used as an example in FIG. 11. The processor 40, the memory 41, and the communication interface 42 that are in the base station may be connected through a bus or in other manners. In FIG. 11, the connection through a bus is used as an example. The bus represents one or more of several types of bus structures, including a memory bus or a memory controller, a peripheral bus, an accelerated graphics port, a processor, or a local bus using any bus structure among multiple bus structures.

As a computer-readable storage medium, the memory 41 may be configured to store a software program, a computer-executable program, and a module, for example, a program instruction/module corresponding to the method for transmission processing in the embodiments of the present application. The processor 40 runs the software program, the instruction, and the module that are stored in the memory 41 to execute at least one of the function applications and data processing of the base station, that is, to implement the preceding method for transmission processing.

The memory 41 may mainly include a program storage region and a data storage region. The program storage region may store an operating system and an application program required for implementing at least one function. The data storage region may store data created according to the use of the UE. Additionally, the memory 41 may include a high-speed random access memory and may further include a non-volatile memory, for example, at least one magnetic disk memory element, flash memory element, or other non-volatile solid-state memory element. In some examples, the memory 41 may include memories that are remotely disposed with respect to the processor 40. These remote memories may be connected to the base station via a network. The examples of the preceding network include, but are not limited to, the Internet, an intranet, a local area network, a mobile communication network, and a combination thereof.

The communication interface 42 may be configured to receive and send data.

Figure 12:
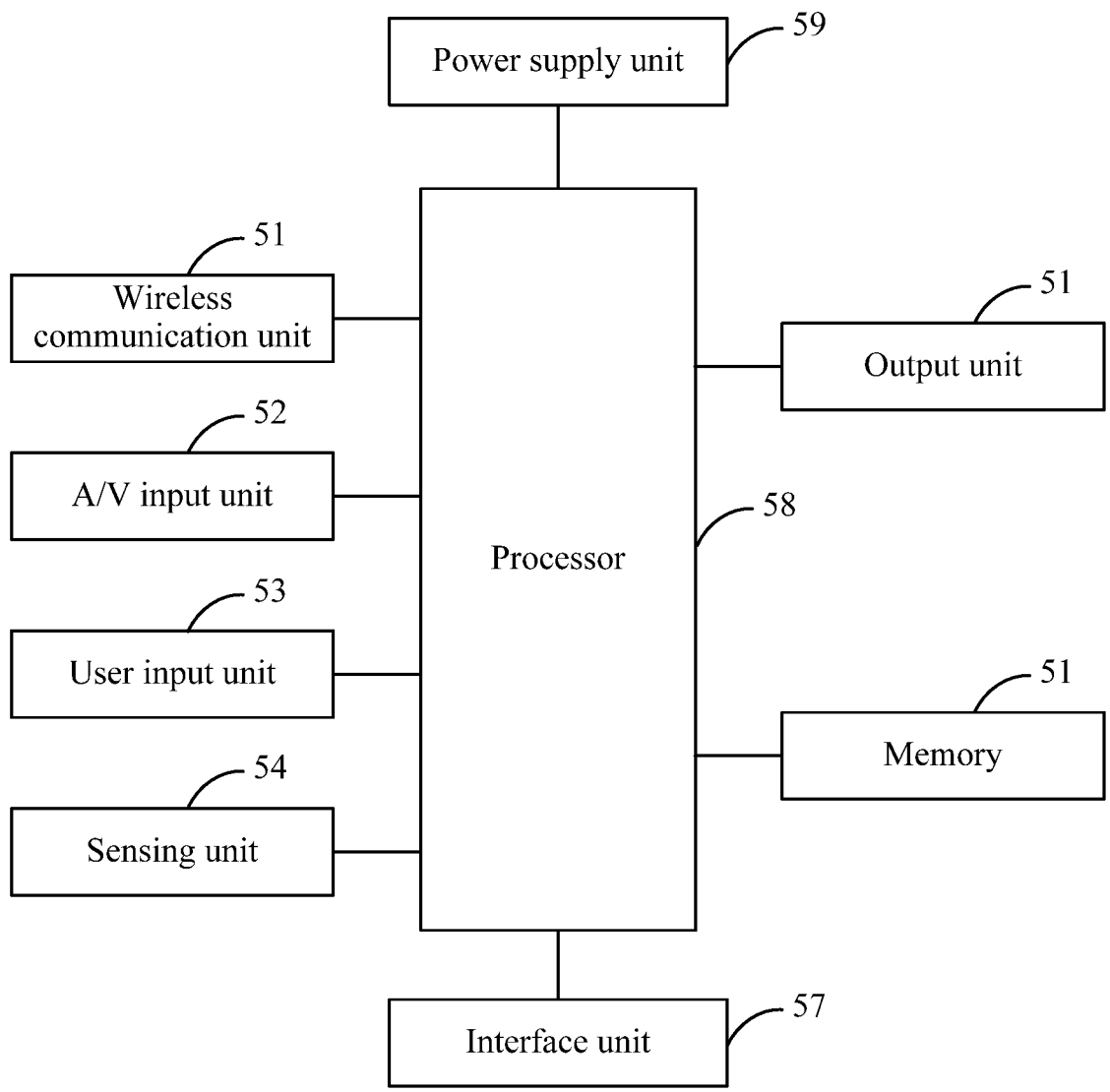
FIG. 12 is a diagram illustrating the structure of a UE according to an embodiment.

FIG. 12 is a diagram illustrating the structure of a UE according to an embodiment. The UE may be implemented in multiple forms. The UE in the present application may include, but is not limited to, a mobile terminal device and a fixed terminal device. The mobile terminal device may be, for example, a mobile phone, a smartphone, a notebook computer, a digital broadcast receiver, a personal digital assistant (PDA), a portable device (PAD), a portable media player (PMP), a navigation apparatus, a vehicle-mounted terminal device, a vehicle-mounted display terminal, and a vehicle-mounted electronic rearview mirror. The fixed terminal device may be, for example, a digital television (TV) and a desktop computer.

As shown in FIG. 12, the UE 50 may include a wireless communication unit 51, an audio/video (A/V) input unit 52, a user input unit 53, a sensing unit 54, an output unit 55, a memory 56, an interface unit 57, a processor 58, and a power supply unit 59. FIG. 12 illustrates the UE with multiple assemblies; however, it is to be noted that not all the illustrated assemblies are required to be implemented. More or fewer assemblies may be implemented instead.

In this embodiment, the wireless communication unit 51 allows wireless communications between the UE 50 and a base station or a network. The A/V input unit 52 is configured to receive audio or video signals. The user input unit 53 may generate key input data according to commands input by the user to control various operations of the UE 50. The sensing unit 54 detects, for example, the current state of the UE 50, the location of the UE 50, the presence or absence of the user's touch input to the UE 50, the orientation of the UE 50, and the movement and direction of the acceleration or deceleration of the UE 50, and generates commands or signals for controlling the operation of the UE 50. The interface unit 57 serves as an interface through which at least one external device may be connected to the UE 50. The output unit 55 is configured to provide output signals in a video, audio, and/or tactile manner. The memory 56 may store, for example, a software program for processing and controlling an operation executed by the processor 58 or may temporarily store data that has been output or is to be output. The memory 56 may include at least one type of storage medium. Moreover, the UE 50 may cooperate with a network storage apparatus that performs the storage function of the memory 56 through the network connection. The processor 58 is generally configured to control the overall operation of the UE 50. The power supply unit 59 receives external power or internal power under the control of the processor 58 and provides the appropriate power required for operating various elements and assemblies.

The processor 58 runs the program stored in the memory 56 to execute at least one function application and data processing, for example, to implement the method for transmission processing provided by embodiments of the present application.

Embodiments of the present application further provide a computer-readable storage medium. The storage medium stores a computer program which, when executed by a processor, causes the processor to perform the method for transmission processing of any embodiment of the present application. The method may be, but is not limited to, the content disclosed in each of the preceding method embodiments.

The computer storage medium in embodiments of the present application may use any combination of one or more computer-readable media. The computer-readable media may be computer-readable signal media or computer-readable storage media. The computer-readable storage medium may be, but is not limited to, an electrical, magnetic, optical, electromagnetic, infrared, or semiconductor system, apparatus, or element, or any combination thereof. More specific examples of the computer-readable storage medium include (non-exhaustive list): an electrical connection having one or more wires, a portable computer magnetic disk, a hard disk, a random-access memory (RAM), a read-only memory (ROM), an electrically erasable, programmable read-only memory (EPROM), a flash memory, an optical fiber, a portable compact disc read-only memory (CD-ROM), an optical storage element, a magnetic storage device, or any suitable combination thereof. In this application, the computer-readable storage medium may be any tangible medium including or storing a program. The program may be used by or used in conjunction with an instruction execution system, apparatus, or element.

The computer-readable signal medium may include a data signal propagated in baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than a computer-readable storage medium. The computer-readable medium may send, propagate, or transmit the program used by or used in conjunction with the instruction execution system, apparatus, or element.

The program codes included on the computer-readable medium may be transmitted on any suitable medium including, and not limited to, a wireless medium, a wire, an optical cable, the radio frequency (RF), or any suitable combination thereof.

Computer program codes for performing the operations of the present disclosure may be written in one or more programming languages or a combination of multiple programming languages. The programming languages include object-oriented programming languages such as Java, Smalltalk, C++, Ruby, and Go and conventional procedural programming languages such as C language or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any kind of network including a local area network (LAN) or a wide area network (WAN) or may be connected to an external computer (for example, via the Internet through an Internet service provider).

The above are only exemplary embodiments of the present application and are not intended to limit the scope of the present application.

It is to be understood by those skilled in the art that the term "user terminal" covers any suitable type of wireless user devices, for example, a mobile phone, a portable data processing apparatus, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by a data processor of a mobile apparatus executing computer program instructions. The implementation, for example, may be in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow in drawings of the present application may represent program steps, or may represent interconnected logic circuits, modules, and functions, or may represent a combination of program steps, logic circuits, modules, and functions. The computer program may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital video disc (DVD) or a compact disc (CD)). The computer-readable storage medium may include a non-transitory storage medium. The data processor may be in any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

What is claimed is:

1. A method for transmission processing, being applied to a base station or a user equipment (UE) and the method comprising:

in a case where at least two transmissions overlap and a priority of a first transmission of the at least two transmissions is lower than a priority of a second transmission of the at least two transmissions, determining that at least first preset time exists between a starting position of the second transmission and an ending position of a dynamic grant of the second transmission;

wherein in a case where the first transmission and the second transmission are each an uplink transmission, the first preset time is determined based on N1 plus M symbols or N2 plus M symbols;

wherein N1 denotes time for the UE processing data transmitted through a physical downlink shared channel (PDSCH), N2 denotes time for a UE preparing data transmitted through a physical uplink shared channel (PUSCH), and the value of M is one of 0, 1 or 2.

2. The method according to claim 1, further comprising:
determining that a starting position of the first transmission is earlier than a point G; and
transmitting the first transmission from the starting position of the first transmission to the point G, or transmitting the first transmission from the starting position of the first transmission to an ending position of the first transmission;
wherein the point G is a time point of the first preset time before the starting position of the second transmission.

3. The method according to claim 2, further comprising:
canceling transmission of the first transmission in a case where the starting position of the first transmission is later than or equal to the point G; or
transmitting the first transmission from the starting position of the first transmission to the ending position of the first transmission in a case where the starting position of the first transmission is later than or equal to the point G and later than or equal to a point H;
wherein the point H is a time point of second preset time after an ending position of the second transmission.

4. The method according to claim 3, wherein the second preset time is determined based on T1 or T1 plus X1 symbols;
in a case where the first transmission and the second transmission are each a downlink transmission, T1 and T3 denote time for processing data of the first transmission and time for processing data of the second transmission respectively, or T1 and T3 denote first processing time $T_{proc,1}$; and D denotes time D1 for canceling the processed first transmission or the processed second transmission; and
wherein a value of D1 is 0, and a value of X1 is 0.

5. The method according to claim 1, wherein
in a case where the first transmission and the second transmission are each provided with a dynamic grant, the dynamic grant of the first transmission is prior to the dynamic grant of the second transmission.

6. The method according to claim 1, wherein the first preset time is determined to further add D symbols, wherein D denotes time D2 for canceling the first transmission, and the value of D2 is one of 0, 1 or 2.

7. The method according to claim 6, wherein in a case where the first transmission is a semi-static uplink transmission and the second transmission is a dynamic uplink transmission, the first preset time is determined to further add X symbols.

8. The method according to claim 7, wherein X has a value of 0.

9. The method according to claim 1, wherein in a case where the first transmission is a semi-static uplink transmission and the second transmission is a dynamic uplink transmission, the first preset time is determined to further add X symbols.

10. A non-transitory computer-readable storage medium storing a computer program which, when executed by a processor, causes the processor to perform the following:

in a case where at least two transmissions overlap and a priority of a first transmission of the at least two transmissions is lower than a priority of a second transmission of the at least two transmissions, determining that at least first preset time exists between a starting position of the second transmission and an ending position of a dynamic grant of the second transmission;

wherein in a case where the first transmission and the second transmission are each an uplink transmission, the first preset time is determined based on N1 plus M symbols or N2 plus M symbols; wherein N1 denotes time for a user equipment (UE) processing data transmitted through a physical downlink shared channel (PDSCH), N2 denotes time for a UE preparing data transmitted through a physical uplink shared channel (PUSCH), and the value of M is one of 0, 1 or 2.

11. The storage medium according to claim 10, wherein the first preset time is determined to further add D symbols, wherein D denotes time D2 for canceling the first transmission, and the value of D2 is one of 0, 1 or 2.

12. The storage medium according to claim 11, wherein in a case where the first transmission is a semi-static uplink transmission and the second transmission is a dynamic uplink transmission, the first preset time is determined to further add X symbols.

13. The storage medium according to claim 12, wherein X has a value of 0.

14. The storage medium according to claim 10, wherein in a case where the first transmission is a semi-static uplink transmission and the second transmission is a dynamic uplink transmission, the first preset time is determined to further add X symbols.

15. The storage medium according to claim 10, wherein the processor is caused to further perform:
    determining that a starting position of the first transmission is earlier than a point G; and
    transmitting the first transmission from the starting position of the first transmission to the point G, or transmitting the first transmission from the starting position of the first transmission to an ending position of the first transmission;
    wherein the point G is a time point of the first preset time before the starting position of the second transmission.

16. The storage medium according to claim 15, wherein the processor is caused to further perform:
    canceling transmission of the first transmission in a case where the starting position of the first transmission is later than or equal to the point G; or
    transmitting the first transmission from the starting position of the first transmission to the ending position of the first transmission in a case where the starting position of the first transmission is later than or equal to the point G and later than or equal to a point H; wherein the point H is a time point of second preset time after an ending position of the second transmission.

17. The storage medium according to claim 16, wherein the second preset time is determined based on T1 or T1 plus X1 symbols;
    in a case where the first transmission and the second transmission are each a downlink transmission, T1 and T3 denote time for processing data of the first transmission and time for processing data of the second transmission respectively, or T1 and T3 denote first processing time $T_{proc,1}$; and D denotes time D1 for canceling the processed first transmission or the processed second transmission; and X1 denotes an adjustment amount of T1;
    wherein a value of D1 is 0, and a value of X1 is 0.

18. The storage medium according to claim 10, wherein in a case where the first transmission and the second transmission are each provided with a dynamic grant, the dynamic grant of the first transmission is prior to the dynamic grant of the second transmission.

* * * * *